United States Patent
Watanabe

(10) Patent No.: US 9,509,977 B2
(45) Date of Patent: Nov. 29, 2016

(54) IMAGE PROCESSING SYSTEM AND MICROSCOPE SYSTEM INCLUDING THE SAME

(71) Applicant: OLYMPUS CORPORATION, Tokyo (JP)

(72) Inventor: Nobuyuki Watanabe, Yokohama (JP)

(73) Assignee: OLYMPUS CORPORATION, Tokyo (JP)

(*) Notice: Subject to any disclaimer, the term of this patent is extended or adjusted under 35 U.S.C. 154(b) by 670 days.

(21) Appl. No.: 13/788,526

(22) Filed: Mar. 7, 2013

(65) Prior Publication Data
US 2013/0258058 A1  Oct. 3, 2013

(30) Foreign Application Priority Data

Mar. 28, 2012 (JP) ................................ 2012-073354
Mar. 28, 2012 (JP) ................................ 2012-075081

(51) Int. Cl.
  *H04N 13/02* (2006.01)
  *H04N 7/18* (2006.01)
  (Continued)

(52) U.S. Cl.
  CPC ............ *H04N 13/02* (2013.01); *G06T 7/0069* (2013.01); *H04N 5/225* (2013.01); *H04N 7/18* (2013.01); *H04N 13/0235* (2013.01); *G06T 2200/21* (2013.01); *G06T 2207/10016* (2013.01); *G06T 2207/10056* (2013.01); *G06T 2207/10148* (2013.01); *G06T 2207/20016* (2013.01);
  (Continued)

(58) Field of Classification Search
  CPC ......... H04N 5/232; G02B 21/36; G06T 5/50
  See application file for complete search history.

(56) References Cited

U.S. PATENT DOCUMENTS 5,933,513 A * 8/1999 Yoneyama ................ G06T 5/20
                                                       382/106
6,344,930 B1 * 2/2002 Kaneko .................... G02B 3/14
                                                       348/E5.045
(Continued)

FOREIGN PATENT DOCUMENTS

JP     9-298682 A    11/1997
JP     2000-316120 A  11/2000
(Continued)

OTHER PUBLICATIONS

Japanese Office Action dated Jan. 5, 2016 from related Japanese Patent Application No. 2012-073354, together with an English language translation.

*Primary Examiner* — Sath V Perungavoor
*Assistant Examiner* — Howard D Brown, Jr.
(74) *Attorney, Agent, or Firm* — Scully, Scott, Murphy & Presser, P.C.

(57) ABSTRACT

An image processing system includes an image acquisition unit, a candidate value estimation unit, a band characteristics evaluation unit, an effective frequency determination unit and a candidate value modification unit. The acquisition unit acquires images. The estimation unit estimates, for each pixel of the images, a candidate value of a 3D shape. The evaluation unit calculates, for each pixel, a band evaluation value of a band included in the images. The determination unit determines an effective frequency of the pixel based on statistical information of the band evaluation value. The modification unit performs data correction or data interpolation for the candidate value based on the effective frequency and calculates a modified candidate value representing the 3D shape.

23 Claims, 12 Drawing Sheets

(51) Int. Cl.
*H04N 5/225* (2006.01)
*G06T 7/00* (2006.01)

(52) U.S. Cl.
CPC ........... *G06T2207/20064* (2013.01); *G06T 2207/20221* (2013.01)

(56) References Cited

U.S. PATENT DOCUMENTS

| | | | | |
|---|---|---|---|---|
| 2008/0120053 A1* | 5/2008 | Pupalaikis | ............. | G01R 23/16 702/79 |
| 2010/0194966 A1* | 8/2010 | Abe | ......................... | G02B 7/38 348/345 |
| 2011/0206293 A1* | 8/2011 | Sasaki | ....................... | G06T 5/50 382/274 |
| 2013/0155203 A1* | 6/2013 | Watanabe | .......... | H04N 13/0207 348/49 |
| 2013/0258058 A1* | 10/2013 | Watanabe | .............. | H04N 13/02 348/46 |
| 2013/0315462 A1* | 11/2013 | Wachinger | .......... | G01S 7/52046 382/131 |

FOREIGN PATENT DOCUMENTS

| | | |
|---|---|---|
| JP | 2010-166247 A | 7/2010 |
| JP | 2011-170717 A | 9/2011 |

\* cited by examiner

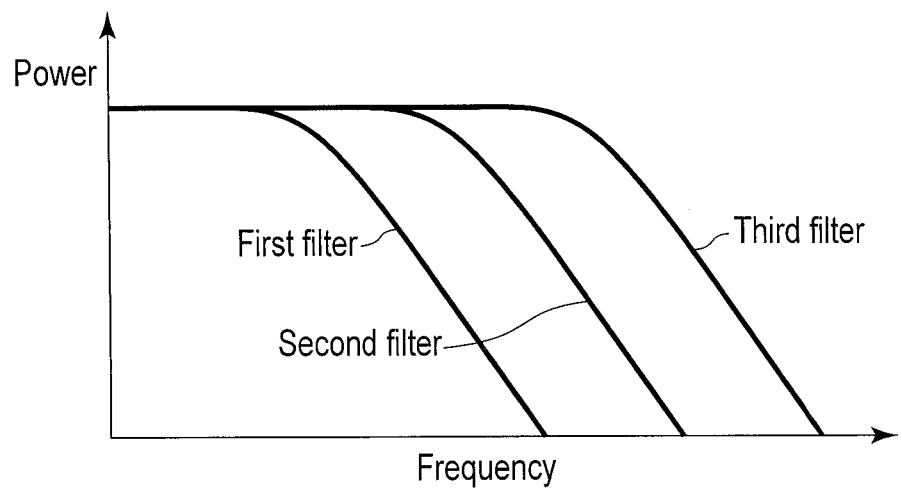
F I G. 2
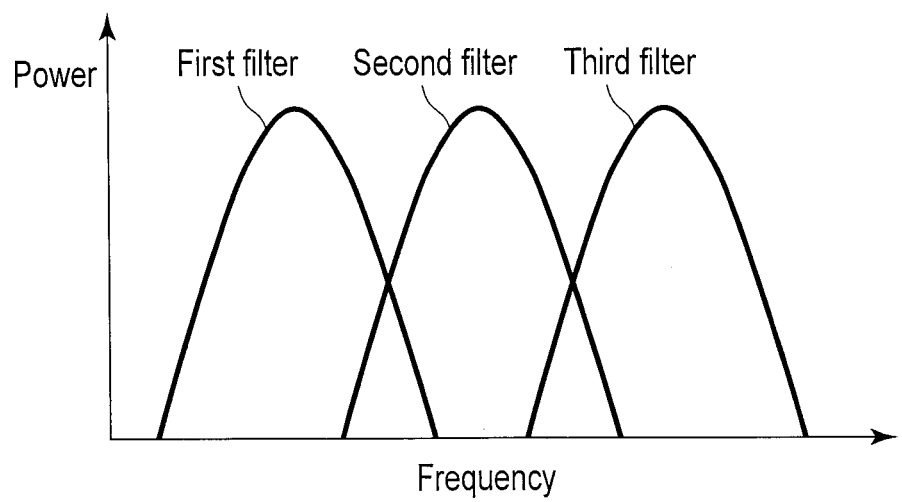
F I G. 3

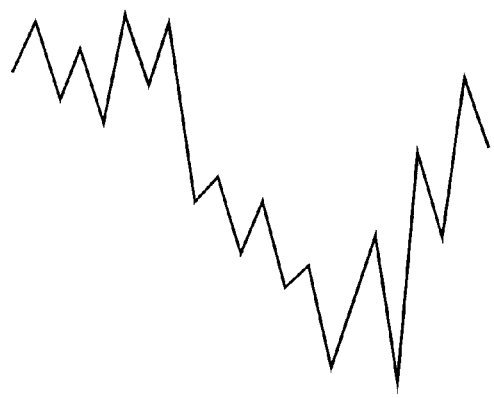
F I G. 6A
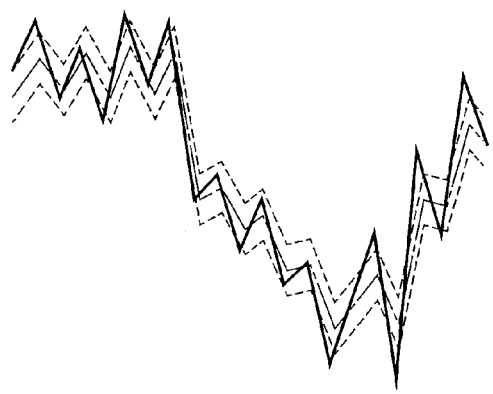
F I G. 6B
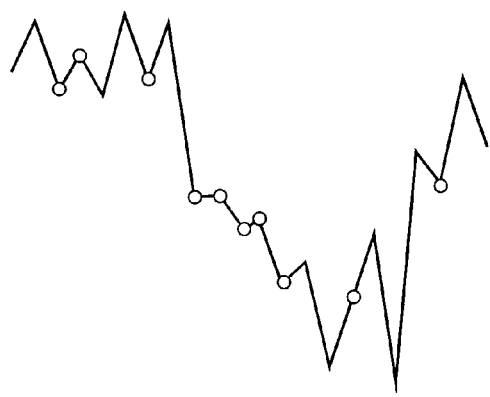
F I G. 6C

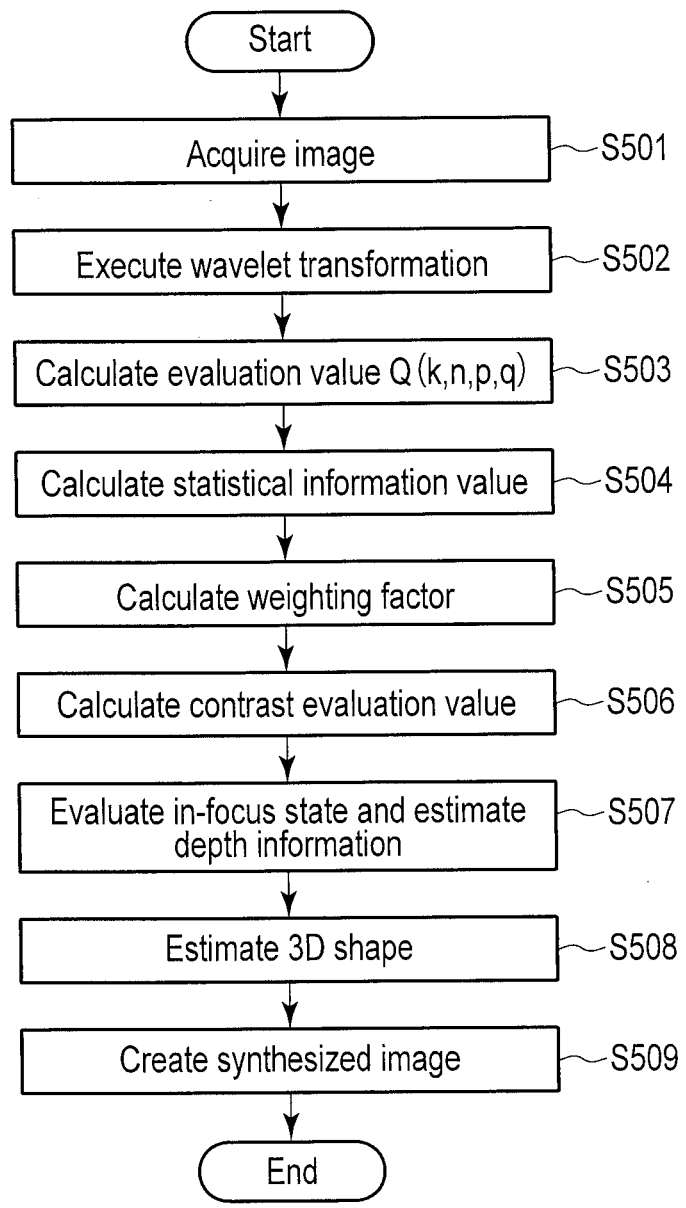
F I G. 12

IMAGE PROCESSING SYSTEM AND MICROSCOPE SYSTEM INCLUDING THE SAME

CROSS-REFERENCE TO RELATED APPLICATIONS

This application is based upon and claims the benefit of priority from prior Japanese Patent Applications No. 2012-073354, filed Mar. 28, 2012; and No. 2012-075081, filed Mar. 28, 2012, the entire contents of all of which are incorporated herein by reference.

BACKGROUND OF THE INVENTION

1. Field of the Invention

The present invention relates to an image processing system and a microscope system including the same.

2. Description of the Related Art

In general, a method of evaluating an in-focus state based on the band contrast of an image is known. In-focus evaluation based on a contrast is used not only for an autofocus function but also, for example, to acquire the depth information of an object. The depth information is acquired by, for example, capturing an object at a plurality of focus positions and then selecting an in-focus image from the plurality of images for each position. In addition, the depth information is used when capturing an object at a plurality of focus positions, selecting an in-focus image from the plurality of images for each position of the object, and synthesizing the in-focus images to create an all-in-focus image or a 3D reconstructed image.

When creating an all-in-focus image or a 3D reconstructed image, a best-in-focus image is selected from a plurality of images having different focal planes for each position in an image, and the 3D shape of the sample is estimated. After that, optimization processing needs to be performed for the estimated value of the 3D shape. This optimization processing can include reducing estimation errors of isolated points based on the correlation between pixels. The optimization processing can also include estimating the sample shape for a position where the above-described selection cannot be done.

For example, Jpn. Pat. Appln. KOKAI Publication No. 9-298682 discloses a technique concerning a microscope system for creasing an all-in-focus image. Jpn. Pat. Appln. KOKAI Publication No. 9-298682 discloses performing processing using a recovery filter after all-in-focus image creation. The frequency band of an image generally changes depending on the optical system, magnification, the characteristics of the object, and the like used to acquire the image. In the technique disclosed in Jpn. Pat. Appln. KOKAI Publication No. 9-298682, the coefficient of the recovery filter is determined in accordance with the settings of the optical system, including the magnification and the numerical aperture of the objective lens, in consideration of the change in the band of the optical system.

For example, Jpn. Pat. Appln. KOKAI Publication No. 2010-166247 discloses a technique of judging an in-focus state based on a contrast and creating an all-in-focus image based on an in-focus image. Jpn. Pat. Appln. KOKAI Publication No. 2010-166247 also discloses a technique concerning controlling the characteristics of a filter configured to restrict a high frequency so as to obtain a predetermined contrast even in an out-of-focus region.

BRIEF SUMMARY OF THE INVENTION

According to an aspect of the present invention, an image processing system includes an image acquisition unit configured to acquire a plurality of images obtained by capturing a single object at different focus positions; a candidate value estimation unit configured to estimate, for each pixel of the images, a candidate value of a 3D shape based on the plurality of images; a band characteristics evaluation unit configured to calculate, for each pixel of the images, a band evaluation value of a band included in the images for each of a plurality of frequency bands; an effective frequency determination unit configured to determine an effective frequency of the pixel based on statistical information of the band evaluation value; and a candidate value modification unit configured to perform at least one of data correction and data interpolation for the candidate value based on the effective frequency and calculate a modified candidate value representing the 3D shape of the object.

According to an aspect of the present invention, a microscope system includes a microscope optical system; an imaging unit configured to acquire an image of a sample via the microscope optical system as a sample image; and the above described image processing system which is configured to acquire the sample image as the image.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a view showing an example of a frequency characteristic of a filter bank of a band processing unit according to the first and second embodiments;

FIG. 3 is a view showing another example of a frequency characteristic of a filter bank of a band processing unit according to the first and second embodiments;

FIG. 6A is a view showing an example of an original signal corresponding to a shape candidate value so as to explain coring processing;

FIG. 6B is a view showing an example of a moving average and a threshold so as to explain coring processing;

FIG. 6C is a view showing an example of a result of coring processing so as to explain coring processing;

FIG. 12 is a flowchart showing an example of processing of an image processing system according to a modification of the fourth embodiment.

DETAILED DESCRIPTION OF THE INVENTION

First Embodiment

Figure 1:
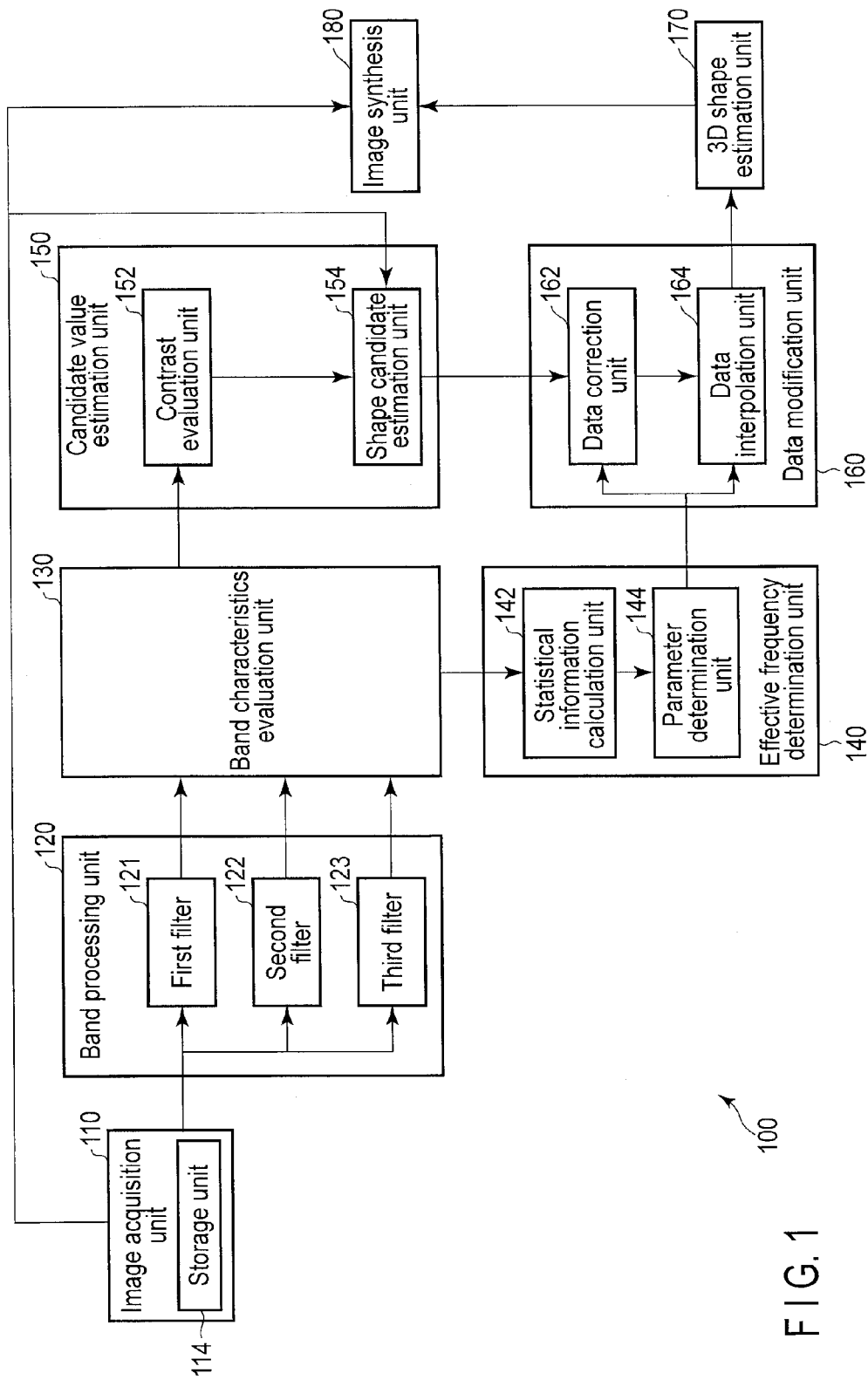
FIG. 1 is a block diagram showing an example of a configuration of an image processing system according to first and second embodiments.

The first embodiment of the present invention will be described with reference to the accompanying drawing. FIG. 1 shows the outline of an example of the configuration of an image processing system 100 according to this embodiment. As shown in FIG. 1, the image processing system 100 comprises an image acquisition unit 110, a band processing unit 120, a band characteristics evaluation unit 130, an effective frequency determination unit 140, a candidate value estimation unit 150, a data modification unit 160, a 3D shape estimation unit 170 and an image synthesis unit 180. The effective frequency determination unit 140 includes a statistical information calculation unit 142 and a parameter determination unit 144. The candidate value estimation unit 150 includes a contrast evaluation unit 152 and a shape candidate estimation unit 154. The data modification unit 160 includes a data correction unit 162 and a data interpolation unit 164.

The image acquisition unit 110 includes a storage unit 114. The image acquisition unit 110 acquires a plurality of images obtained by capturing a single object while changing the focus position and stores them in the storage unit 114. Each of the images is assumed to include information about the focus position of the optical system, that is, information about the depth at the time of image acquisition. The image acquisition unit 110 outputs the images in response to requests from the band processing unit 120, the shape candidate estimation unit 154, and the image synthesis unit 180.

The band processing unit 120 has a filter bank. That is, the band processing unit 120 includes, for example, a first filter 121, a second filter 122, and a third filter 123. FIG. 2 shows the frequency characteristics of the first filter 121, the second filter 122, and the third filter 123. As shown in FIG. 2, these filters are low-pass filters, and the cutoff frequency becomes high in the order of the first filter 121, the second filter 122, and the third filter 123. That is, the filters pass different signal frequency bands. Note that the first filter 121, the second filter 122, and the third filter 123 may be bandpass filters having frequency characteristics as shown in FIG. 3. Any other filters may be used as long as the plurality of filters are designed to pass different frequency bands. In this embodiment, the band processing unit 120 includes three filters. However, an arbitrary number of filters can be used. The band processing unit 120 acquires the images from the image acquisition unit 110, and performs filter processing for each region (for example, each pixel) of each of the plurality of images at different focus positions using the first filter 121, the second filter 122, and the third filter 123. The following description will be made assuming that the processing is performed for each pixel. However, the processing may be performed for each region including a plurality of pixels. The band processing unit 120 outputs the result of the filter processing to the band characteristics evaluation unit 130.

The band characteristics evaluation unit 130 calculates a band evaluation value for each pixel of the plurality of images that have undergone the filter processing. The band evaluation value is obtained by, for example, calculating the integrated value of the signals that have passed the filters. The band evaluation value is thus obtained for each pixel and each frequency band in each image. The band characteristics evaluation unit 130 outputs the calculated band evaluation value to the statistical information calculation unit 142 in the effective frequency determination unit 140 and the contrast evaluation unit 152 in the candidate value estimation unit 150.

The statistical information calculation unit 142 in the effective frequency determination unit 140 calculates, for each frequency band, a statistical information value having a relationship to the average of the band evaluation values of the plurality of images at different focus positions. The statistical information will be described later. The statistical information calculation unit 142 outputs the calculated statistical information value to the parameter determination unit 144.

The parameter determination unit 144 in the effective frequency determination unit 140 calculates an effective frequency based on the statistical information value input from the statistical information calculation unit 142. The parameter determination unit 144 also calculates, based on the effective frequency, a correction parameter used by the data correction unit 162 in the data modification unit 160 and an interpolation parameter used by the data interpolation unit 164 in the data modification unit 160. Calculation of the correction parameter and the interpolation parameter will be described later. The parameter determination unit 144 outputs the calculated correction parameter to the data correction unit 162 in the data modification unit 160 and the interpolation parameter to the data interpolation unit 164 in the data modification unit 160. Note that the frequency determination can be done using a filter bank as in this embodiment or data based on frequency analysis by orthogonal basis such as wavelet transformation.

The contrast evaluation unit 152 in the candidate value estimation unit 150 evaluates the strength of a high-frequency component for each pixel of the plurality of images based on the band evaluation value input from the band characteristics evaluation unit 130 and calculates a contrast evaluation value. To calculate the contrast evaluation value, the contrast evaluation unit 152 can use one of the plurality of band evaluation values calculated by the band characteristics evaluation unit 130 or the plurality of band evaluation values. The contrast evaluation unit 152 outputs the calculated contrast evaluation value for each pixel of each image to the shape candidate estimation unit 154.

The shape candidate estimation unit 154 provided in the candidate value estimation unit 150 evaluates the in-focus state of each pixel of each of the plurality of images based on the contrast evaluation value input from the contrast evaluation unit 152. The shape candidate estimation unit 154 selects the best-in-focus image out of the plurality of images having different focal position for each pixel of the image. The shape candidate estimation unit 154 acquires, from the image acquisition unit 110, the information of the focal position when the best-in-focus image has been captured, estimates the depth of the sample corresponding to each pixel of the image based on the information, and calculates a shape candidate value that is information as the estimation value of the 3D shape of the object. For a pixel for which the depth of the object could not be estimated based on the contrast evaluation value, the shape candidate estimation unit 154 sets a value representing inestimability as the shape candidate value corresponding to the pixel. The shape candidate estimation unit 154 outputs each calculated shape candidate value to the data correction unit 162 in the data modification unit 160.

The data correction unit 162 provided in the data modification unit 160 performs noise coring for the shape candidate values input from the shape candidate estimation unit 154 to remove noise of the shape candidate values. When performing the coring processing, the data correction unit 162 uses the correction parameters input from the parameter determination unit 144, as will be described later in detail. The data correction unit 162 outputs, to the data interpolation unit 164, noise-removed shape candidate values that are shape candidate values having undergone noise removal.

The data interpolation unit 164 provided in the data modification unit 160 interpolates data for each pixel having a value representing inestimability out of the noise-removed shape candidate values input from the data correction unit 162. When interpolating data, the data interpolation unit 164 uses the interpolation parameters input from the parameter determination unit 144, as will be described later in detail. The data interpolation unit 164 outputs, to the 3D shape estimation unit 170, interpolated shape candidate values that are shape candidate values having undergone noise removal and interpolation of the values of the inestimable pixels.

The 3D shape estimation unit 170 optimizes depth information based on the interpolated shape candidate values input from the data interpolation unit 164, and determines the estimated value of the 3D shape of the object. The 3D shape estimation unit 170 outputs the determined 3D shape of the object to the image synthesis unit 180. The image synthesis unit 180 synthesizes a synthesized image by combining the plurality of images having different focal position based on the 3D shape of the object input from the 3D shape estimation unit 170 and the plurality of images acquired from the image acquisition unit 110. This synthesized image is, for example, a 3D reconstructed image or an all-in-focus image. The image synthesis unit 180 outputs the created synthesized image to, for example, a display unit to display it, or outputs the synthesized image to, for example, a storage device to store it.

Figure 4:
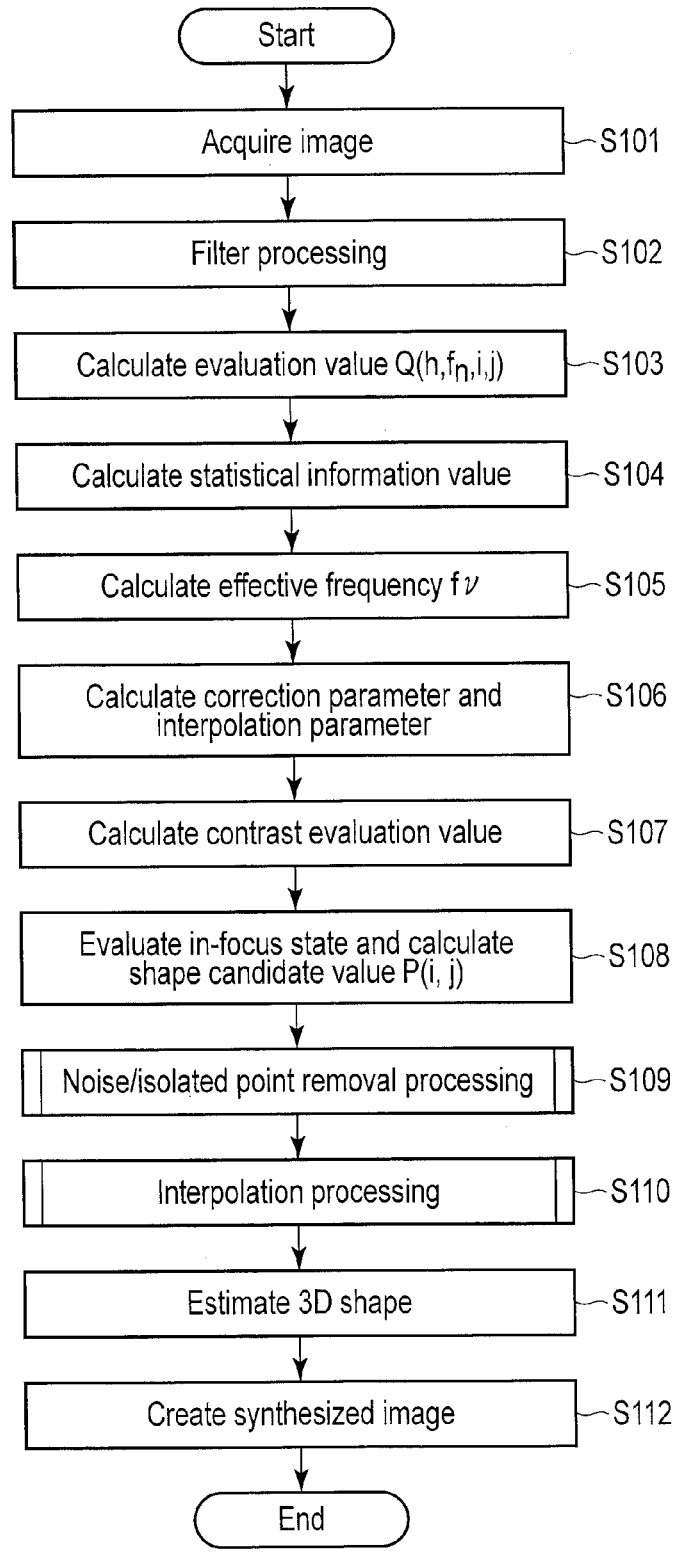
FIG. 4 is a flowchart showing an example of processing of the image processing system according to the first embodiment.

An example of the operation of the image processing system 100 according to this embodiment will be described with reference to the flowchart of FIG. 4. In step S101, the image acquisition unit 110 acquires a plurality of images obtained by capturing a single object while changing the focus position. Each of the images is assumed to include information about the depth such as information about the focus position of the optical system at the time of acquiring the image. The image acquisition unit 110 stores the acquired images in the storage unit 114.

In step S102, the band processing unit 120 performs filter processing for each pixel of the plurality of images at different focus positions stored in the storage unit 114 using, for example, the first filter 121, the second filter 122, and the third filter 123. An arbitrary number of filters can be used. Hence, the following description will be made assuming that the band processing unit 120 includes N filters. The band processing unit 120 outputs the result of the filter processing to the band characteristics evaluation unit 130.

In step S103, the band characteristics evaluation unit 130 calculates, for each band, a band evaluation value for each region of the plurality of images that have undergone the filter processing. That is, the band characteristics evaluation unit 130 calculates, for each frequency band $f_n$ (n=1, 2, ..., N), a band evaluation value $Q(h, f_n, i, j)$ for each focus position h (h=1, 2, ..., H) and each pixel (i, j) (each pixel (i, j) included in a whole region A of the image), that is, for each data I(h, i, j). The band evaluation value $Q(h, f_n, i, j)$ is calculated as, for example, the integrated value of the signals that have passed the filters, which is an amount corresponding to the amplitude in each band the filter passes. The band characteristics evaluation unit 130 outputs the band evaluation value $Q(h, f_n, i, j)$ to the statistical information calculation unit 142 and the contrast evaluation unit 152.

In step S104, the statistical information calculation unit 142 calculates, for each frequency band, a statistical information value representing the average of the band evaluation values $Q(h, f_n, i, j)$ of the plurality of images at different focus positions. The statistical information value is represented by, for example, the average $L(f_n, i, j)$ given by $$L(f_n, i, j) = \frac{1}{H}\sum_{h=1}^{H} Q(h, f_n, i, j). \tag{1}$$

The statistical information calculation unit 142 outputs the calculated statistical information value to the parameter determination unit 144.

In step S105, the parameter determination unit 144 determines an effective frequency fv. The effective frequency fv is determined in, for example, the following way. A variable $L_N(f_n, i, j)$ is set to 1 or 0 depending on whether the value concerning the average $L(f_n, i, j)$ meets a predetermined condition. That is, the variable $L_N(f_n, i, j)$ is given by, for example, $$L_N(f_m, i, j) = \begin{cases} 1 & \text{if } \dfrac{L(f_m, i, j)}{\sum\limits_{f_n=f_1}^{f_N} L(f_n, i, j)} > Thr \\ 0 & \text{else,} \end{cases} \tag{2}$$

where a threshold Thr is an arbitrary design value such as 0.2 when N=5. The effective frequency fv is determined using the variable $L_N(f_n, i, j)$. For example, counting is performed from the low frequency side, that is, n is sequentially increased from the low frequency side, and $f_{m-1}$ relative to a minimum frequency $f_m$ meeting $$\sum_{m=1}^{n} L_N(f_m, i, j) < n \tag{3}$$

is determined as the effective frequency fv.
That is, a maximum frequency meeting $$\frac{L(f_m, i, j)}{\sum\limits_{f_n=f_1}^{f_N} L(f_n, i, j)} > Thr \tag{4}$$

is determined as the effective frequency fv. Note that processing using expressions (2) and (3) need not always be performed, and a maximum frequency more than the threshold Thr may simply be determined as the effective frequency fv.

In step S106, the parameter determination unit 144 determines correction parameters m, n, and w(k, l) to be used by the data correction unit 162, and interpolation parameters $\sigma_k$ and $\sigma_l$ to be used by the data interpolation unit 164 based on the effective frequency fv. The parameter determination unit 144 stores, for example, a lookup table representing the relationship between the effective frequency fv and correction parameters m, n, and w(k, l). The parameter determination unit 144 determines correction parameters m, n, and w(k, l) based on the effective frequency fv by looking up the lookup table. The lower the effective frequency fv is, the larger the values of correction parameters m and n are. As correction parameter w(k, l), a function that does not decrease the weight when the values m and n are large is given in equation (7), to be described later. The parameter determination unit 144 outputs the determined correction parameters m, n, and w(k, l) to the data correction unit 162.

The dimension of the distance and the dimension of the frequency (for example, the number of cycles per unit distance) hold a reciprocal relationship. Hence, the parameter determination unit 144 may obtain correction parameters m and n by $$m = \text{int}\left(\frac{C_1}{fv}\right) \quad (5)$$

$$n = \text{int}\left(\frac{C_2}{fv}\right),$$

where int is integerization processing, and $C_1$ and $C_2$ are arbitrary coefficients. Alternatively, a function generally having a negative correlation may be used.

The parameter determination unit 144 also determines interpolation parameters $\sigma_k$ and $\sigma_l$ to be used by the data interpolation unit 164 based on the effective frequency fv. The parameter determination unit 144 stores, for example, a lookup table representing the relationship between the effective frequency fv and the interpolation parameters $\sigma_k$ and $\sigma_l$. The parameter determination unit 144 determines the interpolation parameters $\sigma_k$ and $\sigma_l$ based on the effective frequency fu by looking up the lookup table. The lower the effective frequency fσ is, the larger the values of the interpolation parameters $\sigma_k$ and $\sigma_l$ are. The parameter determination unit 144 outputs the determined interpolation parameters $\sigma_k$ and $\sigma_l$ to the data interpolation unit 164.

As will be described later, the interpolation parameters $\sigma_k$ and $\sigma_l$ represent the variance. The variance has the dimension of the distance. Hence, like correction parameters m and n, the parameter determination unit 144 may obtain the interpolation parameters $\sigma_k$ and $\sigma_l$ by $$\sigma_k = \text{int}\left(\frac{C_3}{fv}\right) \quad (6)$$

$$\sigma_1 = \text{int}\left(\frac{C_4}{fv}\right),$$

where int is integerization processing, and $C_3$ and $C_4$ are arbitrary coefficients.

In step S107, the contrast evaluation unit 152 acquires the band evaluation value $Q(h, f_n, i, j)$ from the band characteristics evaluation unit 130, evaluates the strength of a high-frequency component for each pixel of the plurality of images, and calculates a contrast evaluation value. The contrast evaluation unit 152 outputs the calculated contrast evaluation value for each pixel of each image to the shape candidate estimation unit 154.

In step S108, the shape candidate estimation unit 154 evaluates the in-focus state of each pixel of the plurality of images based on the contrast evaluation value input from the contrast evaluation unit 152. For example, the higher the contrast is, the higher the shape candidate estimation unit 154 evaluates the degree of in-focus. The shape candidate estimation unit 154 also selects a best-in-focus image from the plurality of images having different focal planes for each pixel of an image. The shape candidate estimation unit 154 acquires, from the image acquisition unit 110, information of the focus position at the time of capture of the best-in-focus image. The shape candidate estimation unit 154 estimates the depth of the object corresponding to each pixel of the image based on the information acquired from the image acquisition unit 110, and calculates a shape candidate value P(i, j) that is information about the shape of the object. The shape candidate value P(i, j) represents the depth of the object at, for example, coordinates (i, j). If the depth of the object could not be estimated based on the contrast evaluation value, the shape candidate estimation unit 154 sets a value representing inestimability as the shape candidate value P(i, j) corresponding to the pixel. The shape candidate estimation unit 154 outputs the calculated shape candidate value P(i, j) to the data correction unit 162 in the data modification unit 160.

In step S109, the data correction unit 162 performs noise/isolated point removal processing of removing noise and isolated points from the shape candidate value P(i, j). In this embodiment, the noise/isolated point removal processing is performed by coring processing. The noise/isolated point removal processing will be explained with reference to the flowchart shown in FIG. 5.

In step S210, the data correction unit 162 loads the shape candidate value P(i, j). In this embodiment, the image is assumed to have a size of (p+1) pixels from 0 to p in the horizontal direction and a size of (q+1) pixels from 0 to q in the vertical direction. In step S220, the data correction unit 162 loads correction parameters m, n, and w(k, l).

Figure 5:
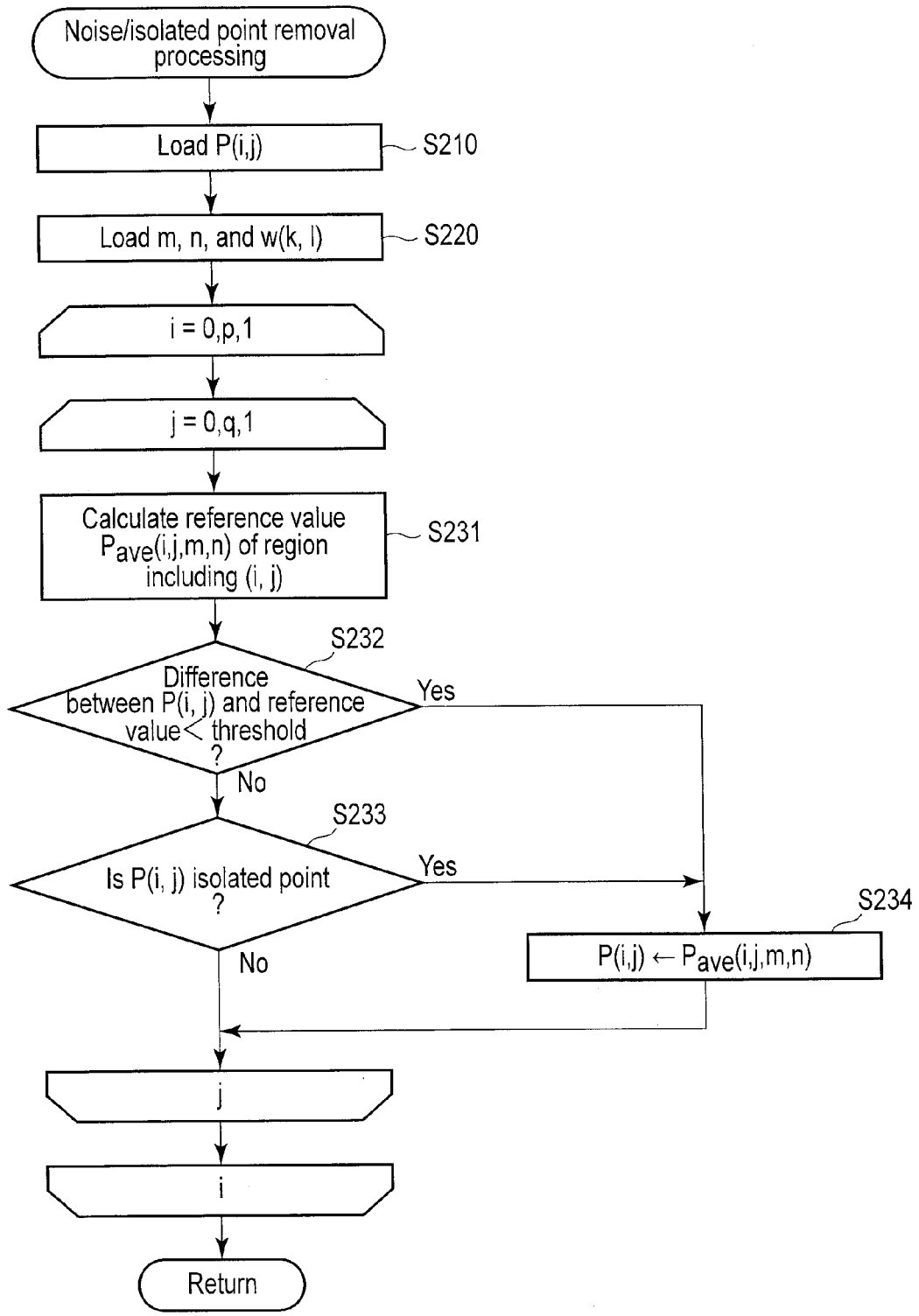
FIG. 5 is a flowchart showing an example of noise/isolated point removal processing according to the first embodiment.

In this embodiment, as shown in FIG. 5, the following processing is sequentially performed for the shape candidate values P(i, j) corresponding to all pixels of an image in steps S231 to S234. In step S231, the data correction unit 162 calculates a reference value $P_{ave}(i, j, m, n)$ of a region including (i, j) based on $$P_{ave}(i, j, m, n) = \frac{1}{(2m+1)(2n+1)} \sum_{k=-m}^{m} \sum_{l=-n}^{n} w(k, l) P(i+k, j+l). \quad (7)$$

As shown in equation (7), the reference value $P_{ave}(i, j, m, n)$ indicates the average value in this region. In equation (7), correction parameters m, n, and w(k, l) determined by the parameter determination unit 144 are used. That is, equation (7) changes in accordance with the effective frequency fv.

In step S232, the data correction unit 162 determines whether the difference between the shape candidate value P(i, j) and the reference value $P_{ave}(i, j, m, n)$ is smaller than a predetermined threshold. If the difference between the shape candidate value P(i, j) and the reference value $P_{ave}(i, j, m, n)$ is smaller than a predetermined threshold $Th_{r-1}$, that is, if "$|P(i, j) - P_{ave}(i, j, m, n)| < Th_{r-1}$" is true, the process goes to step S234. Note that the threshold $Th_{r-1}$ is defined based on an empirical rule such as a criterion to determine whether the difference falls within the error range of the reference value or not.

On the other hand, if the difference between the shape candidate value $P(i, j)$ and the reference value $P_{ave}(i, j, m, n)$ is not smaller than the predetermined threshold, the data correction unit 162 determines, in step S233, whether the shape candidate value $P(i, j)$ is an isolated point. If the shape candidate value $P(i, j)$ is an isolated point, the process goes to step S234.

As the determination whether the shape candidate value $P(i, j)$ is an isolated point, a determination whether "$|P(i, j)-P_{ave}(i, j, m, n)|>Th_{r-2}$" is true or not is employed, where $Th_{r-2}$ is a threshold which is set based on the variance in a predetermined region of a plurality of pixels. More specifically, for example, when the variance is $\sigma$, $Th_{r-2}$ is set as $\pm 2\sigma$.

In step S234, the data correction unit 162 sets the value of the shape candidate value $P(i, j)$ to the reference value $P_{ave}(i, j, m, n)$. The processes in steps S231 to S234 are performed for all pixels. That is, letting $\Delta T$ be the predetermined threshold, this processing is represented by a noise-removed shape candidate value $P'(i, j)$ that is the shape candidate value after the processing and given by $$P'(i, j) = \begin{cases} P(i, j): \|P(i, j) - P_{ave}(i, j, m, n)\| \geq \Delta T \\ P_{ave}(i, j, m, n): \|P(i, j) - P_{ave}(i, j, m, n)\| < \Delta T. \end{cases} \quad (8)$$

The concept of coring processing used in this embodiment will be explained with reference to FIGS. 6A, 6B, and 6C. FIG. 6A shows an original signal corresponding to the shape candidate value $P(i, j)$. A moving average corresponding to the average value calculated by equation (7) for the original signal is indicated by the dashed-dotted line in FIG. 6B. A value obtained by adding or subtracting a threshold corresponding to the predetermined threshold $\Delta T$ to or from the moving average is indicated by a broken line in FIG. 6B. In this case, as represented by equation (8), when the original signal is located between the two broken lines in FIG. 6B, the original signal is replaced with the moving average indicated by the dashed-dotted line. As a consequence, a result as shown in FIG. 6C is obtained. Note that in FIG. 6C, a circle indicates a value replaced with the moving average. As described above, the coring processing has the effect of suppressing a variation component determined as a small amplitude signal and deleting an error.

The data correction unit 162 outputs the value obtained by performing the noise/isolated point removal processing described with reference to FIG. 5 for the shape candidate value $P(i, j)$, that is, the noise-removed shape candidate value $P'(i, j)$ to the data interpolation unit 164.

In step S110, the data interpolation unit 164 performs interpolation processing, i.e., the data interpolation unit 164 interpolates data whose noise-removed shape candidate value $P'(i, j)$ input from the data correction unit 162 represents inestimability. Inestimability means that the shape candidate estimation unit 154 could not specify the in-focus state of an image when calculating the shape candidate value $P(i, j)$ based on the contrast evaluation value calculated by the contrast evaluation unit 152. That is, inestimability indicates that the contrast evaluation value of any of a plurality of microscopic images for a pixel of interest does not meet a condition representing a predetermined in-focus state.

If values around the noise-removed shape candidate value $P'(i, j)$ representing inestimability are not inestimable, that is, if only one pixel out of a region of, for example, 5 pixels×5 pixels is inestimable, the data interpolation unit 164 interpolates the inestimable data using neighboring data. At this time, the data interpolation unit 164 can use, for example, bilinear interpolation or bicubic interpolation for the data interpolation.

Figure 7:
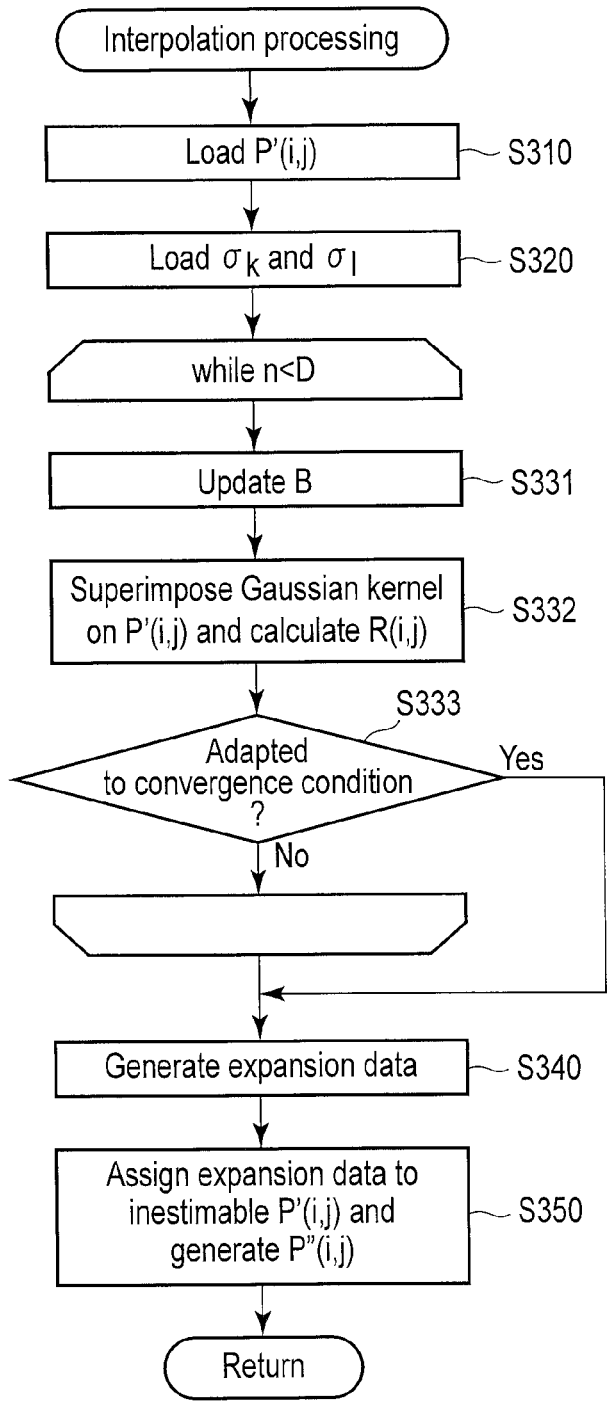
FIG. 7 is a flowchart showing an example of interpolation processing according to the first embodiment.

On the other hand, if noise-removed shape candidate values $P'(i, j)$ representing inestimability continuously exist, the data interpolation unit 164 interpolates the inestimable data based on a function representing the correlation to neighboring data. That is, the distribution around the inestimable portion is assumed, thereby estimating the value of the portion. In this embodiment, kernel regression method is used in interpolation. At this time, the data interpolation unit 164 uses the interpolation parameters $\sigma_k$ and $\sigma_l$ input from the parameter determination unit 144. An example of the interpolation processing will be described with reference to the flowchart of FIG. 7.

In step S310, the data interpolation unit 164 loads the noise-removed shape candidate value $P'(i, j)$. In step S320, the data interpolation unit 164 loads the interpolation parameters $\sigma_k$ and $\sigma_l$. Next, the data interpolation unit 164 calculates interpolation data $R(i, j)$. The interpolation data $R(i, j)$ is given by $$R(i, j) = \frac{1}{N} \sum_{P'(i+k, j+l) \neq 0} P'(i+k, j+l) C(k, l), \quad (9)$$

where N is the number of sampling points which is given by $$N = (2k+1) \cdot (2l+1). \quad (10)$$

In addition, $C(k, j)$ is given by $$C(k, l) = B \cdot \exp\left(-\frac{1}{2}\left(\frac{k}{\sigma_k}\right)^2\right) \exp\left(-\frac{1}{2}\left(\frac{l}{\sigma_l}\right)^2\right). \quad (11)$$

As indicated by equation (11), $C(k, l)$ is determined in accordance with the interpolation parameters $\sigma_k$ and $\sigma_l$. B is a variable number.

In step S331, the data interpolation unit 164 updates the variable B. In step S332, the data interpolation unit 164 superimposes a Gaussian kernel on the noise-removed shape candidate value $P'(i, j)$ based on equations (9) to (11). In step S333, the data interpolation unit 164 determines whether the value obtained in step S332 meets a predetermined convergence condition which is, for example, given by $$\sum_{i,j \in A} \|P'(i, j) - R(i, j)\| < Thr, \quad (12)$$

where Thr is a predetermined threshold. If the value meets the convergence condition, the process goes to step S340. On the other hand, if the value does not meet the convergence condition, the processes in steps S331 to S333 are repeated up to a predetermined count D. That is, the interpolation data $R(i, j)$ for each variable B is calculated in step S332, and it is determined in step S333 whether the calculated interpolation data $R(i, j)$ meets the convergence condition until the convergence condition is met while changing the value of the variable B in step S331.

Upon determining in step S333 that the interpolation data R(i, j) meets the convergence condition, in step S340, the data interpolation unit 164 generates expansion data based on the interpolation data R(i, j) that meets the convergence condition. In step S350, the data interpolation unit 164 assigns the generated expansion data to the inestimable data of the noise-removed shape candidate values P'(i, j), thereby generating an interpolated shape candidate value P"(i, j). The data interpolation unit 164 outputs the generated interpolated shape candidate value P"(i, j) to the 3D shape estimation unit 170.

Referring back to FIG. 4, explanation will be continued. In step 111, the 3D shape estimation unit 170 optimizes depth information based on the interpolated shape candidate value P"(i, j) input from the data interpolation unit 164, and estimates the 3D shape of the object. The 3D shape estimation unit 170 outputs the estimated 3D shape of the sample to the image synthesis unit 180.

In step S112, the image synthesis unit 180 synthesizes a synthesized image by combining the plurality of images having different focal position based on the 3D shape of the object input from the 3D shape estimation unit 170 and the plurality of images acquired from the image acquisition unit 110. If the synthesized image is, for example, a 3D reconstructed image, the synthesized image is created by synthesizing the 3D shape with the in-focus images concerning the respective portions of the 3D shape. If the synthesized image is, for example, an all-in-focus image, images extracted from images having focal position corresponding to the depth of the respective pixels are combined, thereby synthesizing an image that is in focus for all pixels. The image synthesis unit 180 outputs the created synthesized image to a display unit or a storage device.

In the case of that an image of an object whose depth is greater than the depth of field is taken, such as a microscope image, it is difficult for the user to recognize the image. However, by a 3D reconstructed image or an all-in-focus image, the user can easily recognize the image of an object whose depth is greater than the depth of field.

As described above, for example, the image acquisition unit 110 functions as an image acquisition unit configured to acquire a plurality of images obtained by capturing a single object at different focus positions. For example, the candidate value estimation unit 150 functions as a candidate value estimation unit configured to estimate, for each pixel of the images, a candidate value of a 3D shape based on the plurality of images. For example, the band characteristics evaluation unit 130 functions as a band characteristics evaluation unit configured to calculate, for each pixel of the plurality of images, the band evaluation value of a band included in the images for each of a plurality of frequency bands. For example, the effective frequency determination unit 140 functions as an effective frequency determination unit configured to determine the effective frequency of the pixel based on statistical information of the band evaluation value. For example, the data modification unit 160 functions as a candidate value modification unit configured to perform at least one of data correction and data interpolation for the candidate value based on the effective frequency and calculate a modified candidate value representing the 3D shape of the object. For example, the data correction unit 162 functions as a modified candidate value calculation unit configured to calculate a modified candidate value using correlation of the value of a local region represented by the candidate value. For example, the 3D shape estimation unit 170 functions as an all-in-focus image creation unit or a 3D reconstructed image creation unit.

According to this embodiment, as the result of the noise/isolated point removal processing by the data correction unit 162, errors caused by noise and estimation processing are effectively reduced in the images. In this embodiment, correction parameters m and n used in the noise/isolated point removal processing are determined based on the effective frequency fv of the images. The lower the effective frequency fv is, the larger the values of correction parameters m and n are. For this reason, in equation (7), as the effective frequency fv decreases, the reference value $P_{ave}$(i, j, m, n) is calculated based on the shape candidate values P(i, j) in a wider region. As the effective frequency fv increases, the reference value $P_{ave}$(i, j, m, n) is calculated based on the shape candidate values P(i, j) in a narrower region. That is, the optimum reference value $P_{ave}$(i, j, m, n) is calculated in accordance with the effective frequency fv of the images. As a result, noise can accurately be reduced as compared to a case in which the effective frequency fv of the images is not taken into consideration. That is, the shape candidate values P(i, j) are not excessively smoothed. Even if many noise components exist, the input signal is not excessively evaluated as a high frequency signal.

In the interpolation processing of the data interpolation unit 164, information of the effective frequency fv of the images is used when assuming the correlation of neighboring data. That is, an optimized Gaussian kernel corresponding to the frequency band can be generated, and the value of the depth of the object at a position, which is inestimable based on the contrast evaluation value, can be estimated. At this time, the interpolation parameters $\sigma_k$ and $\sigma_l$ are given based on the effective frequency fv. It is therefore possible to increase the processing speed due to the small calculation amount and prevent the calculation result from converging to an incorrect value by comparison with a case in which the convergence value is searched for while changing the values of the interpolation parameters. The lower the effective frequency fv is, the larger the values of the interpolation parameters $\sigma_k$ and $\sigma_l$ are. For this reason, in equation (9), the interpolation data R(i, j) is calculated based on the noise-removed shape candidate values P'(i, j) in a wider region. As the effective frequency fv increases, the interpolation data R(i, j) is calculated based on the noise-removed shape candidate values P'(i, j) in a narrower region. That is, the noise-removed shape candidate values P'(i, j) are not excessively smoothed. Edge structure evaluation is appropriately done. Even if many noise components exist, the input signal is not excessively evaluated as a high frequency signal.

Note that the above-described equations are merely examples. Not these equations but any other equations may be used as a matter of course as far as the above-described effects can be obtained. For example, polynomials of real number order, logarithmic functions, or exponential functions are usable in place of equations (5) and (6). A variance or the like is also usable in place of equation (1). In the above-described embodiment, the processing is performed for each pixel. However, the processing may be performed for each region including a plurality of pixels.

Modification of First Embodiment

A modification of the first embodiment will be described. Points of difference from the first embodiment will be explained here. The same reference numbers denote the same parts, and a description thereof will be omitted. In the processing of the data interpolation unit 164 according to the first embodiment, the interpolation parameters $\sigma_k$ and $\sigma_l$ are set to $\sigma_k$ and $\sigma_l$ in equation (11), and these values remain unchanged in the loop processing of steps S331 to S333 described with reference to FIG. 7.

In this modification, however, the convergence value is searched for while changing $\sigma_k$ and $\sigma_l$ as well in step S331. Hence, in this modification, the parameter determination unit 144 outputs a range or probability density function capable of setting the interpolation parameters $\sigma_k$ and $\sigma_l$ to the data interpolation unit 164. In the loop processing of steps S331 to S333, the data interpolation unit 164 searches for the convergence value while changing $\sigma_k$ and $\sigma_l$ as well based on the range or probability density function capable of setting the interpolation parameters $\sigma_k$ and $\sigma_l$ and input from the parameter determination unit 144. The rest of the operation is the same as in the first embodiment.

According to this modification, although the amount of processing is greater than in the first embodiment, the interpolation data R(i, j) can converge to a convergence value more suitable than in the first embodiment. In the modification as well, the parameter determination unit 144 determines the range or probability density function capable of setting the interpolation parameters $\sigma_k$ and $\sigma_l$ based on the effective frequency fv of the images. Hence, the same effects as in the first embodiment can be obtained.

Second Embodiment

The second embodiment of the present invention will be described. Points of difference from the first embodiment will be explained here. The same reference numbers denote the same parts, and a description thereof will be omitted. In this embodiment, a data correction unit 162 uses a bilateral filter to remove noise. The bilateral filter used in this embodiment is expressed as $$P'(i,j) = \frac{\sum_{k=-m}^{m}\sum_{l=-n}^{n} P(i+k, j+l)C(k, l)S(P(i, j) - P(i+k, i+l))}{\sum_{k=-m}^{m}\sum_{l=-n}^{n} C(k, l)S(P(i, j) - P(i+k, i+l))}, \quad (13)$$

where C(k, l) is a factor that specifies the distance correlation, and $S(P_1-P_2)$ is a factor that specifies correlation resulting from the pixel level difference between different pixels. The sharpness and the signal-to-noise ratio of a generated image change depending on what kind of distribution function is used for C(k, l) and $S(P_1-P_2)$.

In this embodiment, for example, functions based on a Gaussian distribution is used for the C(k, l) and $S(P_1-P_2)$. That is, C(k, l) is given by, for example, $$C(k,l) = C_5 \cdot \exp\left(-\frac{1}{2}\left(\frac{k}{\sigma_k}\right)^2\right)\exp\left(-\frac{1}{2}\left(\frac{l}{\sigma_l}\right)^2\right), \quad (14)$$

where $\sigma_k$ and $\sigma_l$ are correction parameters, and $C_5$ is a predetermined constant. Correction parameters $\sigma_k$ and $\sigma_l$ are the same as the interpolation parameters $\sigma_k$ and $\sigma_l$ of the first embodiment. In addition, $S(P_1-P_2)$ is given by $$S(P_1 - P_2) = C_6 \cdot \exp\left(-\frac{1}{2}\left(\frac{\|P_1 - P_2\|}{\sigma_p}\right)^2\right), \quad (15)$$

where $\sigma_p$ is a correction parameter, and $C_6$ is a predetermined constant. In this embodiment, a parameter determination unit 144 determines even correction parameter $\sigma_p$ based on a effective frequency fv of the images by looking up a lookup table. The lower the effective frequency fv is, the larger the value of correction parameter $\sigma_p$ is.

Since the correction parameter $\sigma_p$ and the frequency have positive correlation, the parameter determination unit 144 may obtain the correction parameter $\sigma_p$ using an Mth-order (M is an integer greater than 0) polynomial as given by $$\sigma_p = \sum_{m=0}^{M} C_{p(m)} fv^m. \quad (16)$$

As in the first embodiment, when the information of the effective frequency fv of the images is acquired, the original sharpness of the images can be estimated. For example, when the effective frequency fv is low, C(k, l) is set so as to emphasize long-distance correlation, and $S(P_1-P_2)$ is set based on the assumption that no abrupt step is generated with respect to neighboring data. As described above, for example, $S(P_1-P_2)$ functions as first correlation that is correlation between the values of two points spaced apart. For example, C(k, l) functions as second correlation that is correlation by the distance.

In this embodiment, information of the original frequency band of the images is used when assuming the correlation of neighboring data. The bilateral filter is set based on the correlation of neighboring data. According to this embodiment, it is consequently possible to acquire a noise-removed shape candidate value P'(i, j) by effectively reducing noise and errors of a shape candidate value P(i, j).

Note that in this embodiment as well, correction parameters $\sigma_k$, $\sigma_l$, and op may be set as a probability density function, as in the modification of the first embodiment. In this case as well, the same effects as in this embodiment can be obtained.

Modification of Second Embodiment

A modification of the second embodiment will be described. Points of difference from the second embodiment will be explained here. The same reference numbers denote the same parts, and a description thereof will be omitted. In this modification, the data correction unit 162 uses a trilateral filter to remove noise. The trilateral filter used in this modification is expressed as $$P'(i,j) = \quad (17)$$

$$P(i,j) + \frac{\sum_{k=-m}^{m}\sum_{l=-n}^{n} P\Delta(i,j,k,l)C(k,l)S(P\Delta(i,j,k,l))N(i,j,k,l)}{\sum_{k=-m}^{m}\sum_{l=-n}^{n} C(k,l)S(P\Delta(i,j,k,l))N(i,j,k,l)},$$

where $P\Delta(i, j, k, l)$ is given by $$P\Delta(i,j,k,l) = P(i+k,j+l) - P_f(i,j,k,l). \quad (18)$$

In addition, N(i, j, k, l) is given by $$N(i,j,k,l) = \begin{cases} 1 & \text{if } \|U(i+k, j+l) - U(i, j)\| < Thr \\ 0 & \text{else,} \end{cases} \quad (19)$$

where U(i, j) is the smoothed gradient vector which is given by $$U(i, j) = \frac{\sum_{k=-m}^{m}\sum_{l=-n}^{n} \nabla P(i+k, j+l)C(k, l)S\left(\frac{\nabla P(i, j) -}{\nabla P(i+k, j+l)}\right)}{\sum_{k=-m}^{m}\sum_{l=-n}^{n} C(k, l)S(\nabla P(i, j) - \nabla P(i+k, j+l))}, \quad (20)$$

where $P_f(i, j, k, l)$ is given by $$P_f(i,j,k,l)=P(i,j)+U(i,j)_i \cdot k+U(i,j)_j \cdot l, \quad (21)$$

where $U(i, j)_i$ is the horizontal component of the gradient, and $U(i, j)_j$ is the vertical component of the gradient.

This trilateral filter applies the bilateral filter used in the second embodiment to a gradient $\nabla P(i, j)$. Introducing $\nabla P(i, j)$ allows to strongly suppress impulse noise, that is, an isolated variation component.

Even in this modification, C(k, l) and $S(P_1-P_2)$ determined in accordance with the effective frequency fv of the images are used, as in the second embodiment. As a result, the same effects as in the second embodiment can be obtained.

Third Embodiment

The third embodiment of the present invention will be described. Points of difference from the first embodiment will be explained here. The same reference numbers denote the same parts, and a description thereof will be omitted. The third embodiment shows a microscope system 200 comprising the image processing system 100 according to the first embodiment.

Figure 8:
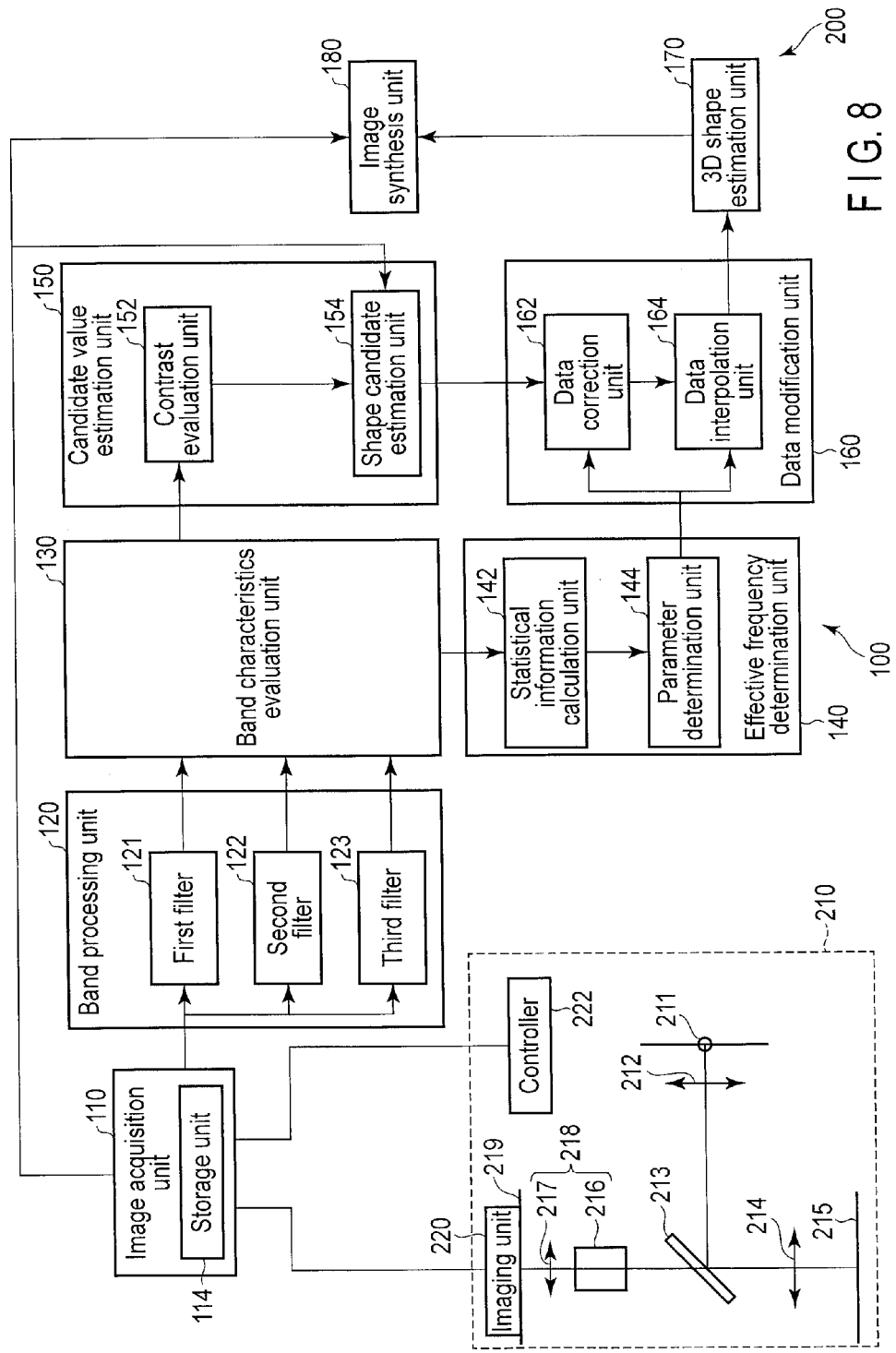
FIG. 8 is a block diagram showing an example of a configuration of a microscope system according to a third embodiment.

FIG. 8 shows the outline of an example of the configuration of the microscope system 200 according to this embodiment. As shown in FIG. 8, the microscope system 200 includes a microscope 210 and the image processing system 100 according to the first embodiment. The microscope 210 is, for example, a digital microscope. The microscope 210 includes an LED light source 211, an illumination optical system 212, an optical path control element 213, an objective lens 214, a sample surface 215 placed on a stage (not shown), an observation optical system 218, an imaging plane 219, an imaging unit 220, and a controller 222. The observation optical system 218 includes a zoom optical system 216 and an imaging optical system 217. The objective lens 214, the optical path control element 213, the zoom optical system 216, and the imaging optical system 217 are arranged in this order on the observation optical path from the sample surface 215 to the imaging plane 219.

Illumination light emitted by the LED light source 211 enters the optical path control element 213 via the illumination optical system 212. The optical path control element 213 reflects the illumination light toward the objective lens 214 on the observation optical path. The illumination light irradiates a sample placed on the sample surface 215 via the objective lens 214.

When irradiated with the illumination light, the sample generates observation light. The observation light is reflected light, fluorescence, or the like. The observation light enters the optical path control element 213. Unlike the illumination light, the optical path control element 213 passes the observation light and makes it enter the observation optical system 218 including the zoom optical system 216 and the imaging optical system 217. The optical path control element 213 is an optical element that reflects or passes incident light in accordance with its characteristic. As the optical path control element 213, for example, a polarizer such as a wire grid or a polarizing beam splitter (PBS), which reflects or passes incident light in accordance with its polarization direction is used. Note that as the optical path control element 213, for example, a dichroic mirror that reflects or passes incident light in accordance with its frequency may be used.

The observation optical system 218 condenses the observation light on the imaging plane 219, and forms an image of the sample on the imaging plane 219. The imaging unit 220 generates an image signal based on the image formed on the imaging plane 219, and outputs the image signal as a microscopic image to the image acquisition unit 110. The controller 222 controls the operations of the microscope 210. In this embodiment, the microscope 210 acquires a plurality of microscopic images of a single sample captured on different focal planes. Hence, the controller 222 causes the imaging unit 220 to acquire the image of the sample on each focal plane while controlling the optical system of the microscope 210 to gradually change the focal plane. More specifically, for example, the controller 222 causes the imaging unit 220 to acquire each image while changing the height of the stage, or the position of the height of the objective lens of the microscope 210. The controller 222 outputs the acquired images and the information about the focal position which is associated with the images to the image acquisition unit 110.

The operation of the microscope system 200 according to this embodiment will be described. The sample is placed on the stage (not shown) resulting that the sample surface 215 is set. The controller 222 controls the microscope 210. The controller 222 gradually changes the focal position of the optical system for the sample by, for example, gradually changing the position of the sample surface 215 in the optical axis direction. More specifically, for example, the controller 222 changes the height of the stage, the height of the objective lens, or the position of the focus lens of the microscope 210. At this time, the controller 222 causes the imaging unit 220 to sequentially acquire the microscopic image of the sample on each focal position. The image acquisition unit 110 acquires a microscopic image of a sample at each focus position from the imaging unit 220. The image acquisition unit 110 also acquires, from the controller 222, the focus position at the time of capture of each image. The image acquisition unit 110 stores the acquired microscopic image in a storage unit 114 in association with the focus position.

Processing of creating a synthesized image by synthesizing a plurality of images at different focus positions based on the microscopic image stored in the storage unit 114 is the same as that of the first embodiment. In this embodiment, the microscope system 200 creates a synthesized image, for example, a 3D reconstructed image or an all-in-focus image concerning the microscopic image. An image synthesis unit 180 outputs the created synthesized image to, for example, a display unit to display it or a storage device to store it. According to the 3D reconstructed image or all-in-focus image, the user can easily recognize an object image having a depth larger than the depth of field, like a general microscopic image.

As described above, for example, the illumination optical system 212, the optical path control element 213, the objective lens 214, the observation optical system 218, and the like function as a microscope optical system. For example, the imaging unit 220 functions as an imaging unit configured to acquire an image of a sample via the microscope optical system as a sample image.

In general, the image enlargement ratio of the optical system of a microscope is higher than that of the optical system of a digital camera. For this reason, the band of the optical system of the microscope is sometimes not so higher than the sampling band of the image sensor of the camera upon micrography. The band of the optical system can change depending on the numerical aperture, magnification, and the like of the optical system. For example, when the microscope has an optical zoom system, the band of the optical system changes as well. According to this embodiment, the statistical information calculation unit 142 calculates a statistical information value in consideration of the frequency band of the image. The parameter determination unit 144 calculates the correction parameter and the interpolation parameter based on the statistical information value. It is possible to accurately reduce noise and the like and appropriately perform interpolation as compared to a case in which the effective frequency fv of the image is not taken into consideration. This allows the microscope system 200 to accurately create the 3D reconstructed microscopic image or all-in-focus microscopic image.

Note that if the optical system of the microscope 210 includes an optical zoom system, the numerical aperture changes depending on the focal length of the optical zoom system, and the band of the microscopic image accordingly changes. For this reason, the embodiment is particularly effective. In the above-described embodiment, the image processing system 100 is the image processing system according to the first embodiment. However, the second embodiment or a modification thereof may be used.

Fourth Embodiment

Figure 9:
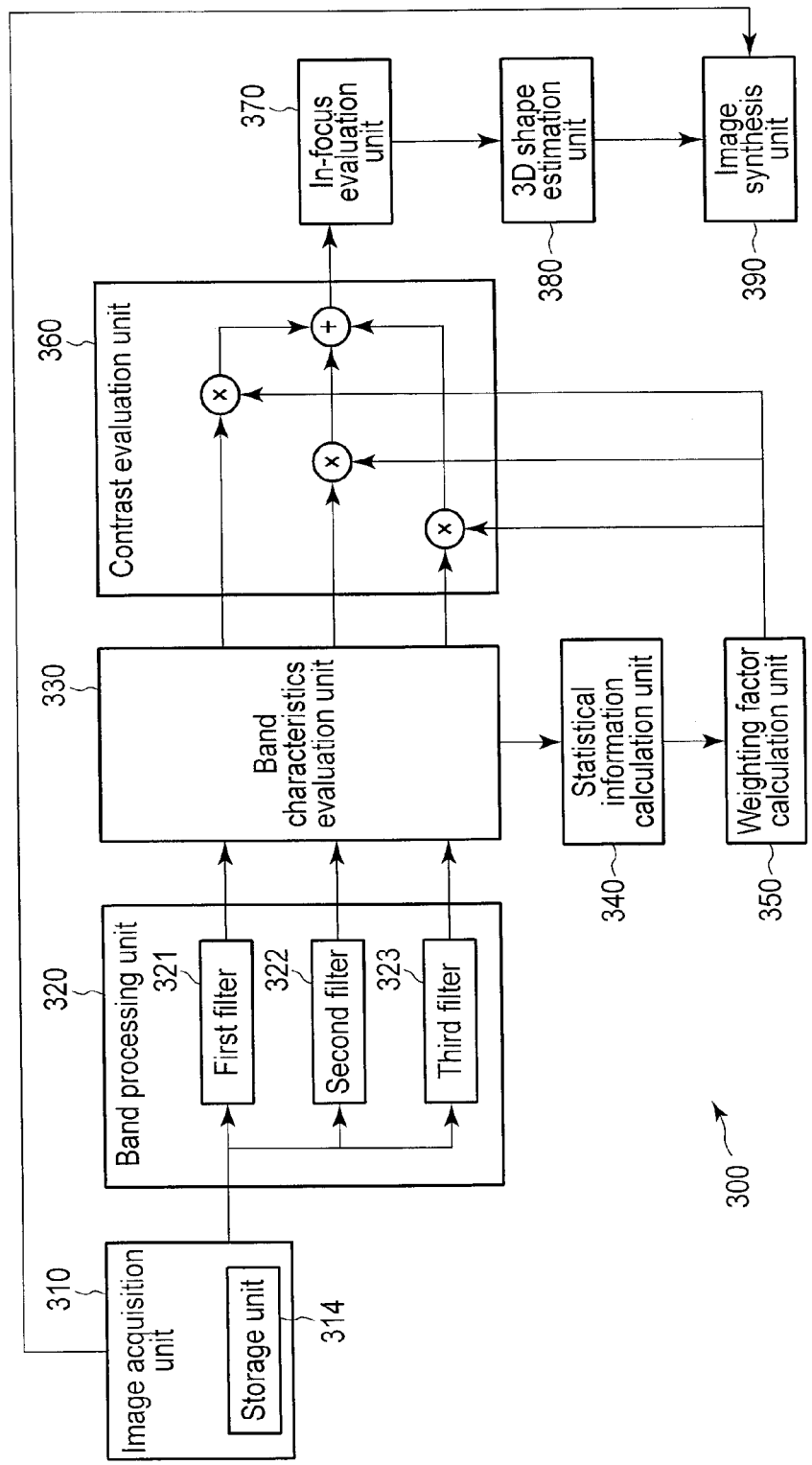
FIG. 9 is a block diagram showing an example of a configuration of an image processing system according to a fourth embodiment.

The fourth embodiment of the present invention will be described with reference to the accompanying drawing. FIG. 9 shows the outline of an example of the configuration of an image processing system 300 according to this embodiment. As shown in FIG. 9, the image processing system 300 comprises an image acquisition unit 310, a band processing unit 320, a band characteristics evaluation unit 330, a Statistical information calculation unit 340, a weighting factor calculation unit 350, a contrast evaluation unit 360, an in-focus evaluation unit 370, a 3D shape estimation unit 380 and an image synthesis unit 390.

The image acquisition unit 310 includes a storage unit 314. The image acquisition unit 310 acquires a plurality of images obtained by capturing a single object while changing the focus position and stores them in the storage unit 314. Each of the images is assumed to include information about the focus position of the optical system at the time of image acquisition, that is, information about the depth of the in-focus positions. The image acquisition unit 310 outputs the images in response to requests from the band processing unit 320 and the image synthesis unit 390.

The band processing unit 320 has a filter bank. That is, the band processing unit 320 includes, for example, a first filter 321, a second filter 322, and a third filter 323. The frequency characteristics of the first filter 321, the second filter 322, and the third filter 323 are, for example, as described above with reference to FIG. 2. Note that the first filter 321, the second filter 322, and the third filter 323 may be bandpass filters having frequency characteristics as shown in FIG. 3. Any other filters may be used as long as the plurality of filters are designed to pass different frequency bands. In this embodiment, the band processing unit 320 includes three filters. However, an arbitrary number of filters can be used. The band processing unit 320 acquires the images from the image acquisition unit 310, and performs filter processing for each region (for example, each pixel) of each of the plurality of images at different focus positions using the first filter 321, the second filter 322, and the third filter 323. The band processing unit 320 outputs the result of the filter processing to the band characteristics evaluation unit 330.

The band characteristics evaluation unit 330 calculates a band evaluation value for each pixel of the plurality of images that have undergone the filter processing. The band evaluation value is obtained by, for example, calculating the integrated value of the signals that have passed the filters. The band evaluation value is thus obtained for each pixel and each frequency band in each image. The band characteristics evaluation unit 330 outputs the calculated band evaluation value to the statistical information calculation unit 340 and the contrast evaluation unit 360.

The statistical information calculation unit 340 calculates, for each frequency band, a statistical information value related to the average of the band evaluation values of the plurality of images at different focus positions. The statistical information will be described later. The statistical information calculation unit 340 outputs the calculated statistical information value to the weighting factor calculation unit 350. The weighting factor calculation unit 350 calculates a value concerning weighting, that is, a weighting factor for each frequency band based on the statistical information value input from the statistical information calculation unit 340. The weighting factor will be described later. The weighting factor calculation unit 350 outputs the calculated weighting factor to the contrast evaluation unit 360.

The contrast evaluation unit 360 multiplies the band evaluation value input from the band characteristics evaluation unit 330 by the weighting factor of the corresponding band input from the weighting factor calculation unit 350, thereby calculating a contrast evaluation value. The contrast evaluation unit 360 outputs the calculated contrast evaluation value to the in-focus evaluation unit 370. Based on the contrast evaluation value input from the contrast evaluation unit 360, the in-focus evaluation unit 370 evaluates the in-focus state of each region of each of the plurality of images at different focus positions. The in-focus evaluation unit 370 selects an in-focus image for each region and estimates, based on the information of the focus position at the time of capture of the image, depth information corresponding to each region of the image. The in-focus evaluation unit 370 outputs the depth information of each region of the image to the 3D shape estimation unit 380.

The 3D shape estimation unit 380 optimizes depth information based on the depth information input from the in-focus evaluation unit 370, and estimates the estimated value of the 3D shape of the object. The 3D shape estimation unit 380 outputs the estimated 3D shape of the object to the image synthesis unit 390. The image synthesis unit 390 synthesizes a synthesized image by combining the plurality of images having different focal position based on the 3D shape of the object input from the 3D shape estimation unit 380 and the plurality of images acquired from the image acquisition unit 310. This synthesized image is, for example, a 3D reconstructed image or an all-in-focus image. The image synthesis unit 390 outputs the created synthesized image to, for example, a display unit to display it, or outputs the synthesized image to, for example, a storage device to store it.

Figure 10:
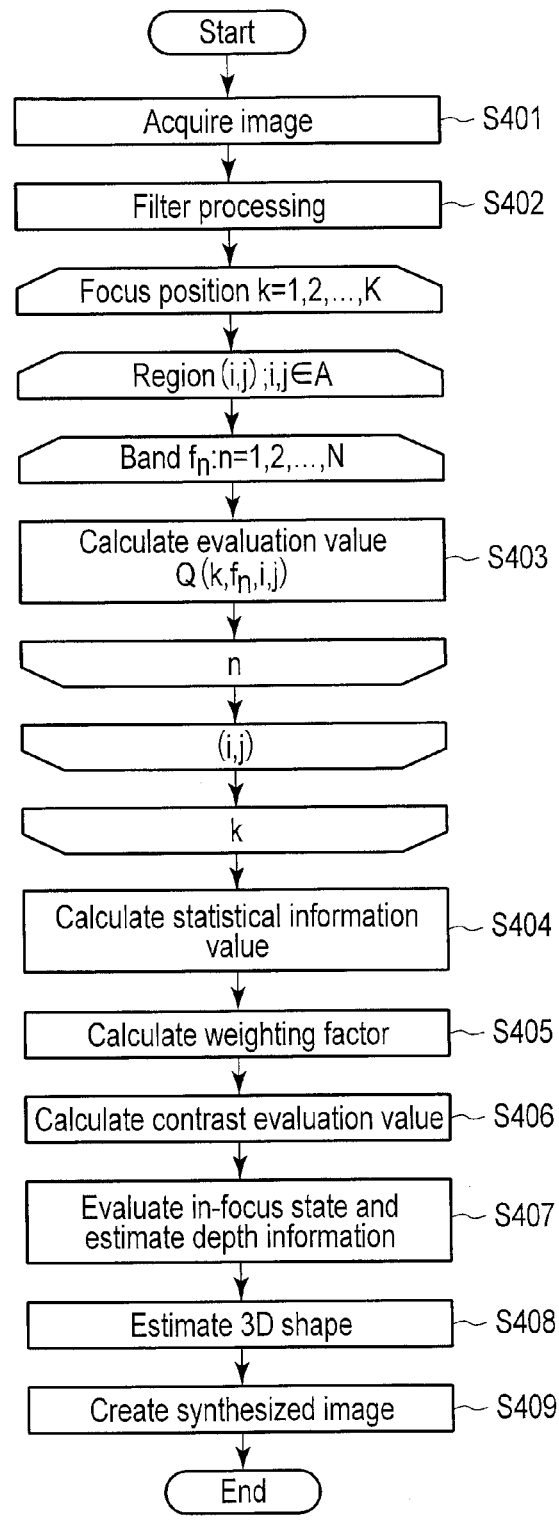
FIG. 10 is a flowchart showing an example of processing of the image processing system according to the fourth embodiment.

An example of the operation of the image processing system 300 according to this embodiment will be described with reference to the flowchart of FIG. 10. In step S401, the image acquisition unit 310 acquires a plurality of images obtained by capturing a single object while changing the focus position. Each of the images is assumed to include information about the depth (for example, information about the focus position of the optical system at the time of acquiring the image). The image acquisition unit 310 stores the acquired images in the storage unit 314.

In step S402, the band processing unit 320 performs filter processing for each area (for example, each pixel) of the plurality of images at different focus positions stored in the storage unit 314 using, for example, the first filter 321, the second filter 322, and the third filter 323. An arbitrary number of filters can be used. Hence, the following description will be made assuming that the band processing unit 320 includes N filters. The band processing unit 320 outputs the result of the filter processing to the band characteristics evaluation unit 330.

In step S403, the band characteristics evaluation unit 330 calculates, for each band, a band evaluation value for each region of the plurality of images that have undergone the filter processing. That is, the band characteristics evaluation unit 330 calculates, for each frequency band $f_n$ (n=1, 2, . . . , N), a band evaluation value Q(k, $f_n$, i, j) for each focus position k (k=1, 2, . . . , K) and each pixel (i, j) (each pixel (i, j) included in a whole region A of the image), that is, for each data I(k, i, j). The band evaluation value Q(k, $f_n$, i, j) is calculated as, for example, the integrated value of the signals that have passed the filters, which is an amount corresponding to the amplitude in each band the filter passes. The band characteristics evaluation unit 330 outputs the band evaluation value Q(k, $f_n$, i, j) to the statistical information calculation unit 340.

In step S404, the statistical information calculation unit 340 calculates, for each frequency band, a statistical information value related to the average of the band evaluation values Q(k, $f_n$, i, j) of the plurality of images at different focus positions. As the statistical information value, various values calculated by various methods are usable, as will be described later. The statistical information calculation unit 340 outputs the calculated statistical information value to the weighting factor calculation unit 350.

In step S405, the weighting factor calculation unit 350 calculates a weighting factor corresponding to each band based on the statistical information value input from the statistical information calculation unit 340. As the weighting factor as well, various values calculated by various methods are usable, as will be described later. The weighting factor calculation unit 350 outputs the calculated weighting factor to the contrast evaluation unit 360.

In step S406, the contrast evaluation unit 360 multiplies the band evaluation value Q(k, $f_n$, i, j) input from the band characteristics evaluation unit 330 by the weighting factor of the corresponding frequency band out of the weighting factors input from the weighting factor calculation unit 350, thereby calculating a contrast evaluation value. The contrast evaluation unit 360 outputs the calculated contrast evaluation value to the in-focus evaluation unit 370.

In step S407, the in-focus evaluation unit 370 evaluates an in-focus state based on the contrast evaluation value acquired from the contrast evaluation unit 360. For example, the in-focus evaluation unit 370 specifies, for each of the plurality of images at different focus positions, a region where the contrast evaluation value is higher than a predetermined threshold as an in-focus region. The in-focus evaluation unit 370 estimates depth information for a point corresponding to the region from the in-focus region out of the plurality of images at different focus positions and information about the focus position at the time of acquiring the image including the region. The depth information is, for example, a value representing the position of the region in the depth direction. The in-focus evaluation unit 370 outputs the depth information of each region to the 3D shape estimation unit 380.

In step 408, the 3D shape estimation unit 380 optimizes depth information such as smoothing based on the depth information input from the in-focus evaluation unit 370, and estimates the 3D shape of the object. The 3D shape estimation unit 380 outputs the estimated 3D shape of the sample to the image synthesis unit 390.

In step S409, the image synthesis unit 390 synthesizes a synthesized image by combining the plurality of images having different focal position based on the 3D shape of the object input from the 3D shape estimation unit 380. If the synthesized image is, for example, a 3D reconstructed image, the synthesized image is created by synthesizing the 3D shape with the in-focus images concerning the respective portions of the 3D shape. If the synthesized image is, for example, an all-in-focus image, images extracted from images having focal position corresponding to the depth of the respective pixels are combined, thereby synthesizing an image that is in focus for all pixels. The image synthesis unit 390 outputs the created synthesized image to a display unit or a storage device.

In the case of that an image of an object whose depth is greater than the depth of field is taken, such as a microscope image, it is difficult for the user to recognize the image. However, by a 3D reconstructed image or an all-in-focus image, the user can easily recognize the image of an object whose depth is greater than the depth of field.

As described above, for example, the image acquisition unit 310 functions as an image acquisition unit configured to acquire a plurality of images obtained by capturing a single object at different focus positions. For example, the band characteristics evaluation unit 330 functions as a band characteristics evaluation unit configured to calculate, for each pixel of images, the band evaluation value of a band included in the image for each of a plurality of frequency bands. For example, the statistical information calculation unit 340 functions as a statistical information calculation unit configured to calculate, for at least each of the plurality of the frequency bands, statistical information using the band evaluation values of at least two focus positions. For example, the weighting factor calculation unit 350 functions as a weighting factor calculation unit configured to calculate, for at least each of the plurality of the frequency bands, a weighting factors corresponding to the band evaluation values based on the statistical information. For example, the contrast evaluation unit 360 functions as a contrast evaluation unit configured to calculate a contrast evaluation values for each region including the at least one pixel in the plurality of images based on the band evaluation values and the weighting factors. For example, the in-focus evaluation unit 370 functions as an in-focus evaluation unit configured to select an in-focus region out of the regions of the plurality of images based on the contrast evaluation values. For example, the image synthesis unit 390 functions as an all-in-focus image creation unit or a 3D reconstructed image creation unit.

According to this embodiment, the band characteristics evaluation unit 330 performs filter processing. The contrast evaluation unit 360 calculates a contrast evaluation value based on a band evaluation value obtained as the result of the filter processing. In general, a contrast evaluation value representing more accurate contrast evaluation is obtained using a filter having a high spectrum for a high frequency. On the other hand, if a contrast evaluation value is calculated based on information of a frequency higher than the frequency band of an image, an inappropriate contrast evaluation value is obtained, which evaluates a factor such as noise irrelevant to the object structure. In this embodiment, the statistical information calculation unit 340 calculates a statistical information value in consideration of the frequency band of the image. The weighting factor calculation unit 350 calculates a weighting factor based on the statistical information value. That is, the weighting factor is determined in consideration of the frequency band of the image. The contrast evaluation unit 360 determines the contrast evaluation value based on the band evaluation value calculated by the band characteristics evaluation unit 330 and the weighting factor calculated by the weighting factor calculation unit 350. It is therefore possible to determine a more accurate contrast evaluation value as compared to a case in which the frequency band of the image is not taken into consideration. This allows the image processing system 300 to accurately create the 3D reconstructed image or all-in-focus image. The image processing system 300 is particularly effective when used for a microscopic image captured by a microscope having a shallow depth of field.

Detailed examples of the statistical information value calculated in step S404, the weighting factor calculated in step S405, and the contrast evaluation value calculated in step S406 will be described next.

First Example

The statistical information value calculated in step S404, the weighting factor calculated in step S405, and the contrast evaluation value calculated in step S406 according to the first example will be described. In this example, the statistical information value is the average of the band evaluation values $Q(k, f_n, i, j)$ at all focus positions (k=1, 2, . . . , K) for each of the regions and frequency bands. That is, the average $L(f_n, i, j)$ is calculated by $$L(f_n, i, j) = \frac{1}{K}\sum_{k=1}^{K} Q(k, f_n, i, j). \tag{22}$$

The weighting factor is a value obtained by dividing the average for each of the regions and frequency bands by the sum of the averages for all frequency bands. That is, a weighting factor $L_N(f_m, j)$ is calculated by $$L_N(f_m, i, j) = \frac{L(f_m, i, j)}{\sum_{f_n=f_1}^{f_N} L(f_n, i, j)}. \tag{23}$$

Based on the band evaluation value $Q(k, f_n, i, j)$ and the weighting factor $L_N(f_m, i, j)$, a contrast evaluation value $D(k, i, j)$ is calculated by $$D(k, i, j) = \sum_{f_m=f_1}^{f_N} L_N(f_m, i, j) \cdot Q(k, f_m, i, j). \tag{24}$$

That is, the contrast evaluation value $D(k, i, j)$ is the sum of the products of the band evaluation value $Q(k, f_n, i, j)$ and the weighting factor $L_N(f_m, i, j)$ of the respective frequency bands.

In step S407, the in-focus evaluation unit 370 selects, for example, k that makes the contrast evaluation value $D(k, i, j)$ highest for each region (i, j) and estimates the depth information.

Note that in this example, when the weighting factor $L_N(f_m, i, j)$ is calculated, the average is divided by the sum of the averages for all frequency bands, as indicated by equation (23). However, the weighting factor $L_N(f_m, i, j)$ may be obtained by dividing the average by the sum of the averages not for all frequency bands but for some frequency bands.

Second Example

The statistical information value calculated in step S404, the weighting factor calculated in step S405, and the contrast evaluation value calculated in step S406 according to the second example will be described. In this example, the statistical information value is the average of the band evaluation values $Q(k, f_n, i, j)$ at all focus positions for each of the regions and frequency bands, as in the first example. That is, the average $L(f_n, i, j)$ is calculated by equation (22). In this example, the average $L(f_n, i, j)$ is used as the weighting factor. Hence, the contrast evaluation value $D(k, i, j)$ is calculated by $$D(k, i, j) = \sum_{f_n=f_1}^{f_N} L(f_n, i, j) \cdot Q(k, f_n, i, j). \tag{25}$$

In step S407, the in-focus evaluation unit 370 estimates the depth information based on the contrast evaluation value $D(k, i, j)$.

Third Example

The statistical information value calculated in step S404, the weighting factor calculated in step S405, and the contrast evaluation value calculated in step S406 according to the third example will be described. In this example, the statistical information value is the average of the band evaluation values $Q(k, f_n, i, j)$ at all focus positions for each of the regions and frequency bands, as in the first example. That is, the average $L(f_n, i, j)$ is calculated by equation (22). In this example, a relative value of the average $L(f_n, i, j)$ to a predetermined frequency band $f_0$ is used as the weighting factor. That is, the weighting factor $L_N(f_m, i, j)$ is calculated by $$L_N(f_m, i, j) = \frac{L(f_m, i, j)}{L(f_0, i, j)}. \tag{26}$$

As the band $f_0$, any value out of n=1 to N is usable. For example, the lowest band is used. The contrast evaluation value $D(k, i, j)$ is calculated by equation (24) using the weighting factor $L_N(f_m, i, j)$.

In step S407, the in-focus evaluation unit 370 estimates the depth information based on the contrast evaluation value $D(k, i, j)$.

Fourth Example

The statistical information value calculated in step S404, the weighting factor calculated in step S405, and the contrast evaluation value calculated in step S406 according to the fourth example will be described. In this example, the statistical information value is the average of the band evaluation values at all focus positions for each of the regions and frequency bands, as in the first example. That is, the average $L(f_n, i, j)$ is calculated by equation (22). In this example, the weighting factor is set to 1 or 0 depending on whether to meet a predetermined condition. That is, whether to use the band evaluation value $Q(k, f_n, i, j)$ is determined in accordance with whether the condition is met. In this example, the weighting factor is calculated by $$L_N(f_m, i, j) = \begin{cases} 1 & \text{if } \frac{L(f_m, i, j)}{\sum_{f_n=f_1}^{f_N} L(f_n, i, j)} > Thr \\ 0 & \text{else,} \end{cases} \quad (27)$$

where a threshold Thr is an arbitrary design value such as 0.2 when N=3. The contrast evaluation value $D(k, i, j)$ is calculated by equation (24) as in the first example.

In step S407, the in-focus evaluation unit 370 estimates the depth information based on the contrast evaluation value $D(k, i, j)$. Note that the judgment when determining the weighting factor may be done using not a value obtained by dividing the average $L(f_n, j)$ by the sum of the averages for all frequency bands as in equation (27) but the average $L(f_n, i, j)$ itself or a value obtained by dividing the average $L(f_n, i, j)$ by the sum of the averages for arbitrary frequency bands or the averages for arbitrary frequency bands.

According to the first to fourth examples, since the weighting factor $L_N(f_m, i, j)$ is calculated for each region, it is particularly effective when the band characteristic is not constant among the regions of an image. According to these examples, the average $L(f_n, j)$ as a statistical information value is calculated for each frequency band. When the average $L(f_n, i, j)$ is small, information necessary for evaluating the contrast is not included in the band evaluation value $Q(k, f_n, i, j)$, or the band evaluation value $Q(k, f_n, j)$ includes noise. According to the first to fourth examples, the weight for the band evaluation value $Q(k, f_n, i, j)$ that does not include the necessary information or includes noise is made small. It is therefore possible to prevent the band evaluation value $Q(k, f_n, i, j)$ that, for example, does not include the necessary information from affecting the contrast evaluation value. As a result, the accurate band evaluation value $Q(k, f_n, i, j)$ is generated, and accurate depth information estimation is implemented based on the band evaluation value $Q(k, f_n, i, j)$.

Fifth Example

The statistical information value calculated in step S404, the weighting factor calculated in step S405, and the contrast evaluation value calculated in step S406 according to the fifth example will be described. In this example, the statistical information value is the variation of the band evaluation values $Q(k, f_n, i, j)$ at all focus positions (k=1, 2, . . . , K) for each of the regions and frequency bands. In this example, a variance is used as an example of the variation. That is, a variance $S(f_n, i, j)$ is calculated, using, for example, the average $L(f_n, i, j)$ calculated by equation (22), by $$S(f_n, i, j) = \sum_{k=1}^{K} (Q(k, f_n, i, j) - L(f_n, i, j))^2. \quad (28)$$

The weighting factor is a value obtained by dividing the variance for each of the regions and frequency bands by the sum of the variances for all frequency bands. That is, a weighting factor $S_N(f_m, i, j)$ is calculated by $$S_N(f_m, i, j) = \frac{S(f_m, i, j)}{\sum_{f_n=f_1}^{F_N} S(f_n, i, j)}. \quad (29)$$

Using the band evaluation value $Q(k, f_n, i, j)$ and the weighting factor $S_N(f_m, i, j)$, the contrast evaluation value $D(k, i, j)$ is calculated by $$D(k, i, j) = \sum_{f_m=f_1}^{f_N} \frac{1}{S_N(f_m, i, j)} Q(k, f_m, i, j). \quad (30)$$

In step S407, the in-focus evaluation unit 370 estimates the depth information based on the contrast evaluation value $D(k, i, j)$. Note that in this example, when calculating the weighting factor $S_N(f_m, i, j)$, the average is divided by the sum of the averages for all frequency bands, as indicated by equation (29). However, the weighting factor $S_N(f_m, i, j)$ may be obtained by dividing the average by the sum of the averages not for all frequency bands but for some frequency bands.

Sixth Example

The statistical information value calculated in step S404, the weighting factor calculated in step S405, and the contrast evaluation value calculated in step S406 according to the sixth example will be described. In this example, the statistical information value is the average of the variances of the band evaluation values $Q(k, f_n, i, j)$ at all focus positions for each of the regions and frequency bands, as in the fifth example. That is, the variance $S(f_n, i, j)$ is calculated by equation (28). In this example, the variance $S(f_n, i, j)$ is used as the weighting factor. Hence, the contrast evaluation value $D(k, i, j)$ is calculated by $$D(k, i, j) = \sum_{f_m=f_1}^{f_N} \frac{1}{S(f_m, i, j)} Q(k, f_m, i, j). \quad (31)$$

In step S407, the in-focus evaluation unit 370 estimates the depth information based on the contrast evaluation value $D(k, i, j)$.

Seventh Example

The statistical information value calculated in step S404, the weighting factor calculated in step S405, and the contrast evaluation value calculated in step S406 according to the seventh example will be described. In this example, the statistical information value is the variance of the band evaluation values $Q(k, f_n, i, j)$ at all focus positions for each of the regions and frequency bands, as in the fifth example. That is, the variance $S(f_n, i, j)$ is calculated by equation (28). In this example, a relative value of the variance $S(f_n, i, j)$ to the predetermined frequency band $f_0$ is used as the weighting factor. That is, the weighting factor $S_N(f_m, j)$ is calculated by $$S_N(f_m, i, j) = \frac{S(f_m, i, j)}{S(f_0, i, j)}. \tag{32}$$

As the band $f_0$, any value out of n=1 to N is usable. The contrast evaluation value $D(k, i, j)$ is calculated by equation (30) using the weighting factor $S_N(f_m, i, j)$.

In step S407, the in-focus evaluation unit 370 estimates the depth information based on the contrast evaluation value $D(k, i, j)$.

According to the fifth to seventh examples, since the weighting factor $S_N(f_m, i, j)$ is calculated for each region, it is particularly effective when the band characteristic is not constant among the regions of an image. According to these examples, the variance $S(f_n, j)$ as a statistical information value is calculated for each frequency band. When the variance $S(f_n, i, j)$, that is, the variation is small, information necessary for evaluating the contrast is not included in the band evaluation value $Q(k, f_n, i, j)$, or the band evaluation value $Q(k, f_n, i, j)$ includes noise, and the variation becomes relatively small. According to the fifth to seventh examples, the weight for the band evaluation value $Q(k, f_n, i, j)$ that does not include the necessary information or includes noise becomes small. It is therefore possible to prevent the band evaluation value $Q(k, f_n, i, j)$ that, for example, does not include the necessary information from affecting the contrast evaluation value. As a result, the accurate band evaluation value $Q(k, f_n, i, j)$ is generated, and accurate depth information estimation is implemented based on the band evaluation value $Q(k, f_n, i, j)$.

Note that when the variation is used, the weighting factor may be set to 1 or 0 depending on whether to meet a predetermined condition, as in the fourth example. That is, whether to use the band evaluation value $Q(k, f_n, i, j)$ is determined in accordance with whether the condition is met. In this case as well, the same effect as in the fifth to seventh examples can be obtained.

Eighth Example

The statistical information value calculated in step S404, the weighting factor calculated in step S405, and the contrast evaluation value calculated in step S406 according to the eighth example will be described. In the first to fourth examples, the average $L(f_n, i, j)$ is determined for each region as the statistical information value. In the eighth example, however, the statistical information value is the average in a whole image A for each band. That is, the average $L(f_n)$ is calculated by $$L(f_n) = \frac{1}{A} \frac{1}{K} \sum_{i,j \in A} \sum_{k=1}^{K} Q(k, f_n, i, j). \tag{33}$$

The weighting factor is a value obtained by dividing the average $L(f_n)$ by the sum of the averages $L(f_n)$ for all frequency bands. That is, a weighting factor $L_N(f_m)$ is calculated by $$L_N(f_m) = \frac{L(f_m)}{\sum_{n=1}^{N} L(f_n)}. \tag{34}$$

Using the band evaluation value $Q(k, f_n, i, j)$ and the weighting factor $L_N(f_m)$, the contrast evaluation value $D(k, i, j)$ is calculated by $$D(k, i, j) = \sum_{f_m=f_1}^{f_N} L_N(f_m) \cdot Q(k, f_m, i, j). \tag{35}$$

In step S407, the in-focus evaluation unit 370 estimates the depth information based on the contrast evaluation value $D(k, i, j)$.

According to this example, when the difference in band characteristic between regions is small, the calculation amount can effectively be reduced. In this example as well, the average may be divided by the sum of the averages not for all frequency bands as indicated by equation (34) but for some frequency bands or the average for specific frequency bands. In equation (35), $L(f_m)$ may be used in place of $L_N(f_m)$. $L_N(f_m)$ may be 1 or 0. As in the fifth to seventh examples, the average of the variances in the whole region A of the image may be used.

Modification of Fourth Embodiment

A modification of the fourth embodiment will be described. Points of difference from the fourth embodiment will be explained here. The same reference numbers denote the same parts, and a description thereof will be omitted. In the image processing system 300 according to this modification, the band processing unit 320 executes wavelet transformation instead of having a filter bank.

Figure 11:
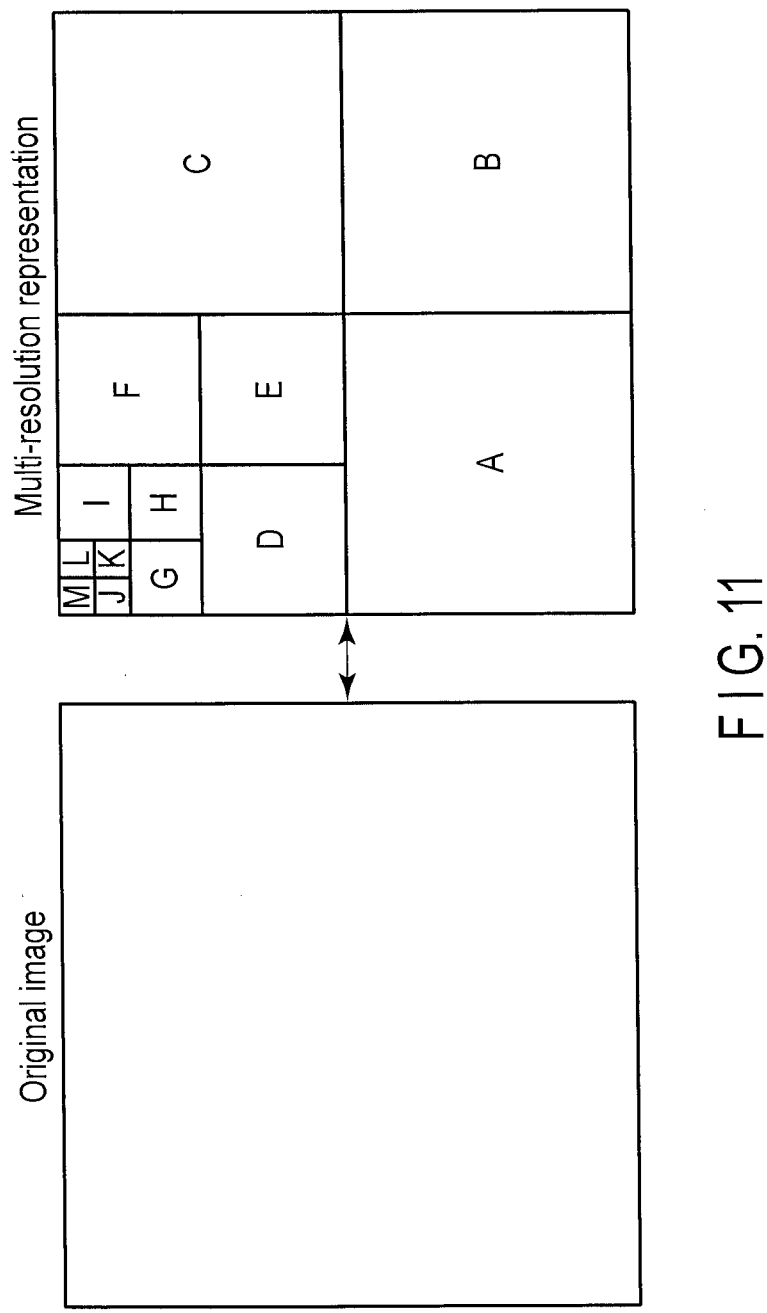
FIG. 11 is a view to explain wavelet transformation.

In the wavelet transformation, filter processing having a specific directivity is performed for an original image as shown on the left side of FIG. 11, thereby acquiring images A, B, and C after band separation, as shown on the right side of FIG. 11. The filter processing having the specific directivity is performed again for an image obtained by reducing the filter residual image, thereby acquiring images D, E, and F. Such processing is repeated to acquire images G, H, and I and images J, K, L, and M. When such transformation processing is executed, image data represented by multi-resolution is created, as shown on the right side of FIG. 11. With this wavelet transformation, an amount corresponding to the gain of a specific band is associated with each region of the image, as in the fourth embodiment.

FIG. 12 is a flowchart illustrating an example of processing of the image processing system 300 according to this modification. In step S501, the image acquisition unit 310 acquires a plurality of images obtained by capturing a single object while changing the focus position and stores the images in the storage unit 314. In step S502, the band processing unit 320 performs wavelet transformation for the plurality of images at different focus positions stored in the storage unit 314. The band processing unit 320 outputs the transformation result to the band characteristics evaluation unit 330. In step S503, the band characteristics evaluation unit 330 calculates an evaluation value for each region (p, q) of the plurality of images that have undergone the wavelet transformation. That is, the coefficient of the number n of stages of the wavelet transformation is set as a band evaluation value Q(k, n, p, q) for each region (p, q), that is, for each data I(k, p, q). The band characteristics evaluation unit 330 outputs the band evaluation value Q(k, n, p, q) to the statistical information calculation unit 340.

In step S504, the statistical information calculation unit 340 calculates a statistical information value. In this modification, the average of the band evaluation values Q(k, n, p, q) at all focus positions k=1, 2, ..., K in each band is defined as the statistical information value $L(f_n)$. That is, the statistical information value $L(f_n)$ is calculated by $$L(f_n) = \frac{1}{F_n} \frac{1}{K} \sum_{p,q \in F_n} \sum_{k=1}^{K} Q(k, n, p, q), \quad (36)$$

where $F_n$ represents the size of the image corresponding to the number n of stages of wavelet transformation. The statistical information calculation unit 340 outputs the calculated statistical information value to the weighting factor calculation unit 350.

In step S505, the weighting factor calculation unit 350 calculates a weighting factor corresponding to each band based on the statistical information value $L(f_n)$ input from the statistical information calculation unit 340. In this modification, the weighting factor $L_N(f_m)$ is calculated by $$L_N(f_m) = \frac{L(f_m)}{\sum_{f_n=f_1}^{N} L(f_n)}. \quad (37)$$

The weighting factor calculation unit 350 outputs the calculated weighting factor $L_N(f_m)$ to the contrast evaluation unit 360.

In step S506, the contrast evaluation unit 360 multiplies the band evaluation value Q(k, n, p, q) input from the band characteristics evaluation unit 330 by the weighting factor $L_N(f_m)$ of the corresponding frequency band input from the weighting factor calculation unit 350, and performs inverse transformation, thereby calculating the contrast evaluation value D(k, i, j) for each region (i, j) of the images before the wavelet transformation. The contrast evaluation unit 360 outputs the calculated contrast evaluation value D(k, i, j) to the in-focus evaluation unit 370.

In step S507, the in-focus evaluation unit 370 evaluates an in-focus state based on the contrast evaluation value D(k, i, j), as in the fourth embodiment, and outputs the depth information of each pixel to the 3D shape estimation unit 380. In step S508, the 3D shape estimation unit 380 performs optimization such as smoothing of the depth information based on the depth information, estimates the 3D shape of the object, and outputs the estimated 3D shape of the object to the image synthesis unit 390. In step S509, the image synthesis unit 390 synthesizes the plurality of images at different focus positions based on the 3D shape of the object and the plurality of images, thereby creating a synthesized image.

According to this modification as well, the same effect as in the fourth embodiment can be obtained.

Fifth Embodiment

The fifth embodiment of the present invention will be described. Points of difference from the fourth embodiment will be explained here. The same reference numbers denote the same parts, and a description thereof will be omitted. The fourth embodiment shows a microscope system 400 comprising the image processing system 300 according to the fourth embodiment.

Figure 13:
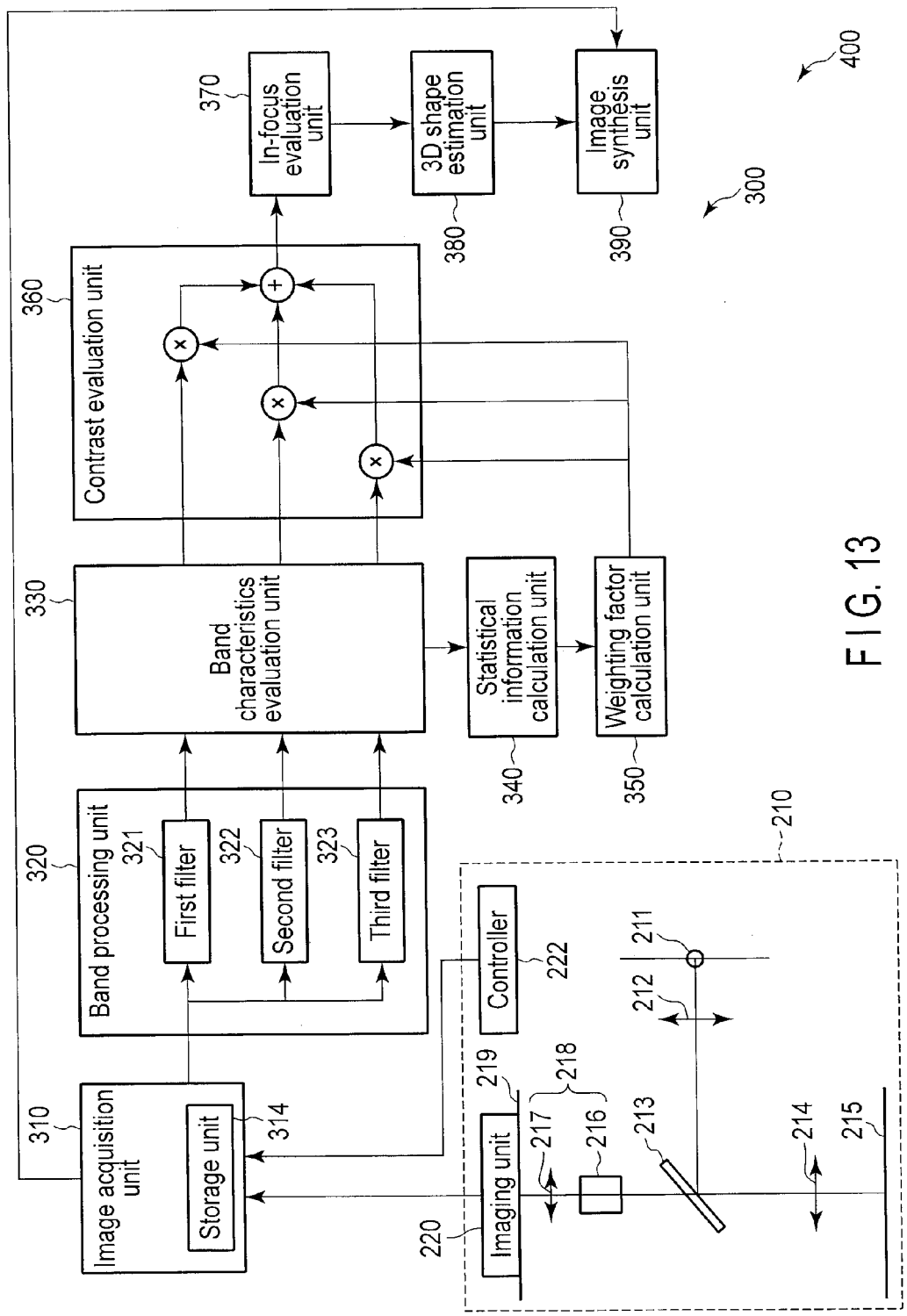
FIG. 13 is a block diagram showing an example of a configuration of a microscope system according to a fifth embodiment.

FIG. 13 shows the outline of an example of the configuration of the microscope system 400 according to this embodiment. As shown in FIG. 13, the microscope system 400 includes a microscope 210 and the image processing system 400 according to the fourth embodiment. The microscope 210 is, for example, a digital microscope. The microscope 210 includes an LED light source 211, an illumination optical system 212, an optical path control element 213, an objective lens 214, a sample surface 215 placed on a stage (not shown), an observation optical system 218, an imaging plane 219, an imaging unit 220, and a controller 222. The observation optical system 218 includes a zoom optical system 216 and an imaging optical system 217. The objective lens 214, the optical path control element 213, the zoom optical system 216, and the imaging optical system 217 are arranged in this order on the observation optical path from the sample surface 215 to the imaging plane 219.

Illumination light emitted by the LED light source 211 enters the optical path control element 213 via the illumination optical system 212. The optical path control element 213 reflects the illumination light toward the objective lens 214 on the observation optical path. The illumination light irradiates a sample placed on the sample surface 215 via the objective lens 214.

When irradiated with the illumination light, the sample generates observation light. The observation light is reflected light, fluorescence, or the like. The observation light enters the optical path control element 213. Unlike the illumination light, the optical path control element 213 passes the observation light and makes it enter the observation optical system 218 including the zoom optical system 216 and the imaging optical system 217. The optical path control element 213 is an optical element that reflects or passes incident light in accordance with its characteristic. As the optical path control element 213, for example, a polarizer such as a wire grid or a polarizing beam splitter (PBS), which reflects or passes incident light in accordance with its polarization direction is used. Note that as the optical path control element 213, for example, a dichroic mirror that reflects or passes incident light in accordance with its frequency may be used.

The observation optical system 218 condenses the observation light on the imaging plane 219, and forms an image of the sample on the imaging plane 219. The imaging unit 220 generates an image signal based on the image formed on the imaging plane 219, and outputs the image signal as a microscopic image to the image acquisition unit 310. The controller 222 controls the operations of the microscope 210. In this embodiment, the microscope 210 acquires a plurality of microscopic images of a single sample captured on different focal planes. Hence, the controller 222 causes the imaging unit 220 to acquire the image of the sample on each focal plane while controlling the optical system of the microscope 210 to gradually change the focal plane. More specifically, for example, the controller 222 causes the imaging unit 220 to acquire each image while changing the height of the stage, or the position of the height of the objective lens of the microscope 210. The controller 222 outputs the acquired images and the information about the focal position which is associated with the images to the image acquisition unit 310.

The operation of the microscope system 400 according to this embodiment will be described. The sample is placed on the stage (not shown) resulting that the sample surface 215 is set. The controller 222 controls the microscope 210. The controller 222 gradually changes the focal position of the optical system for the sample by, for example, gradually changing the position of the sample surface 215 in the optical axis direction. More specifically, for example, the controller 222 changes the height of the stage, the height of the objective lens, or the position of the focus lens of the microscope 210. At this time, the controller 222 causes the imaging unit 220 to sequentially acquire the microscopic image of the sample on each focal position. The image acquisition unit 310 acquires a microscopic image of a sample at each focus position from the imaging unit 220. The image acquisition unit 310 also acquires, from the controller 222, the focus position at the time of capture of each image. The image acquisition unit 310 stores the acquired microscopic image in a storage unit 314 in association with the focus position.

Processing of creating a synthesized image by synthesizing a plurality of images at different focus positions based on the microscopic image stored in the storage unit 314 is the same as that of the fourth embodiment. In this embodiment, the microscope system 400 creates a synthesized image, for example, a 3D reconstructed image or an all-in-focus image concerning the microscopic image. An image synthesis unit 390 outputs the created synthesized image to, for example, a display unit to display it or a storage device to store it. According to the 3D reconstructed image or all-in-focus image, the user can easily recognize an object image having a depth larger than the depth of field, like a general microscopic image.

As described above, for example, the illumination optical system 212, the optical path control element 213, the objective lens 214, the observation optical system 218, and the like function as a microscope optical system. For example, the imaging unit 220 functions as an imaging unit configured to acquire an image of a sample via the microscope optical system as a sample image.

In general, the image enlargement ratio of the optical system of a microscope is higher than that of the optical system of a digital camera. For this reason, the band of the optical system of the microscope is sometimes not so higher than the sampling band of the image sensor of the camera upon micrography. The band of the optical system can change depending on the numerical aperture, magnification, and the like of the optical system. For example, when the microscope has an optical zoom system, the band of the optical system changes as well. According to this embodiment, the statistical information calculation unit 340 calculates a statistical information value in consideration of the frequency band of the image. The weighting factor calculation unit 350 calculates the weighting factor based on the statistical information value. That is, since the contrast evaluation unit 360 determines the contrast evaluation value based on the evaluation value calculated by the band characteristics evaluation unit 330 and the weighting factor calculated in consideration of the frequency band of the image, an accurate contrast evaluation value can be determined. This allows the microscope system 400 to accurately create the 3D reconstructed microscopic image or all-in-focus microscopic image. If the optical system of the microscope 310 includes an optical zoom system, the numerical apertures changes depending on the focal length of the optical zoom system, and the band of the microscopic image accordingly changes. For this reason, the embodiment is particularly effective.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing system comprising:
   an image acquisition unit configured to acquire a plurality of images obtained by capturing a single object at different focus positions;
   a candidate value estimation unit configured to estimate, for each pixel of the images, a candidate value of a 3D shape based on the plurality of images;
   a band characteristics evaluation unit configured to calculate, for each pixel of the images, a band evaluation value of a band included in the images for each of a plurality of frequency bands;
   an effective frequency determination unit configured to determine an effective frequency of the pixel based on statistical information of the band evaluation value; and
   a candidate value modification unit configured to perform at least one of data correction and data interpolation for the candidate value based on the effective frequency and calculate a modified candidate value representing the 3D shape of the object, wherein
   the candidate value modification unit includes a modified candidate value calculation unit configured to calculate the modified candidate value using correlation of a local region represented by the candidate value, and
   a size of an area of the local region is determined in accordance with the effective frequency.

2. The image processing system according to claim 1, wherein
   the correlation includes first correlation that is correlation between values of two points and second correlation that is correlation by a distance, and
   a parameter for calculation of the first correlation and the second correlation is determined in accordance with the effective frequency.

3. The image processing system according to claim 2, wherein
   the modified candidate value calculation unit calculates the modified candidate value using a bilateral filter including the first correlation and the second correlation.

4. The image processing system according to claim 2, wherein
   the correlation is based on a probability density function.

5. The image processing system according to claim 1, wherein
   the candidate value modification unit performs noise reduction using correlation of a local region represented by the candidate value in the data correction.

6. The image processing system according to claim 5, wherein
   the candidate value modification unit suppresses a variation component determined as a small amplitude signal in the noise reduction.

7. The image processing system according to claim 1 wherein
   the area is determined to be wider as the effective frequency becomes low.

8. The image processing system according to claim 1, wherein the data correction includes suppressing an isolated variation component included in the candidate value.

9. The image processing system according to claim 1, wherein
the data interpolation includes interpolating a value at a position inestimable by the candidate value estimation unit using a distance correlation of a local region.

10. The image processing system according to claim 9, wherein
the distance correlation is determined to increase contribution of a wider region as the effective frequency becomes low.

11. The image processing system according to claim 1, further comprising:
an all-in-focus image creation unit configured to create an all-in-focus image based on the modified candidate value and the plurality of images.

12. The image processing system according to claim 1, further comprising:
a 3D reconstructed image creation unit configured to create a 3D reconstructed image based on the modified candidate value and the plurality of images.

13. The image processing system according to claim 1, further comprising:
a statistical information calculation unit configured to calculate, for at least each of the plurality of the frequency bands, the statistical information using the band evaluation values of at least two focus positions; and
a weighting factor calculation unit configured to calculate, for at least each of the plurality of the frequency bands, weighting factors corresponding to the band evaluation values based on the statistical information,
wherein
the candidate value estimation unit includes
a contrast evaluation unit configured to calculate contrast evaluation values for each region including the at least one pixel in the plurality of images based on the band evaluation values and the weighting factors, and
an in-focus evaluation unit configured to select an in-focus region out of the regions of the plurality of images based on the contrast evaluation values, and
the candidate value estimation unit estimates the candidate value based on the in-focus region.

14. The image processing system according to claim 13, wherein
the band evaluation values are amounts corresponding to amplitude in each of the frequency bands.

15. The image processing system according to claim 13, wherein
the statistical information calculation unit further calculates the statistical information for each region,
the weighting factor calculation unit calculates the weighting factors for each region, and
the contrast evaluation unit calculates the contrast evaluation values based on the band evaluation values of each region and the weighting factors of each region.

16. The image processing system according to claim 13, wherein
the statistical information is an average of the band evaluation values corresponding to the plurality of images at the different focus positions.

17. The image processing system according to claim 13, wherein
the statistical information is a relative value obtained by dividing an average of the band evaluation values corresponding to the plurality of images at the different focus positions by a sum of the averages for at least one of the frequency bands.

18. The image processing system according to claim 13, wherein
the statistical information is a relative value obtained by dividing an average of the band evaluation values corresponding to the plurality of images at the different focus positions by a sum of the averages for all of the frequency bands.

19. The image processing system according to claim 13, wherein
the statistical information is a variation of the band evaluation values corresponding to the plurality of images at the different focus positions.

20. The image processing system according to claim 13, wherein
the statistical information is a relative value obtained by dividing a variation of the band evaluation values corresponding to the plurality of images at the different focus positions by a sum of the variations for at least one of the frequency bands.

21. The image processing system according to claim 13, wherein
the statistical information is a relative value obtained by dividing a variation of the band evaluation values corresponding to the plurality of images at the different focus positions by a sum of the variations for all of the frequency bands.

22. A microscope system comprising:
a microscope optical system;
an imaging unit configured to acquire an image of a sample via the microscope optical system as a sample image; and
the image processing system of claim 1 which is configured to acquire the sample image as the image.

23. A microscope system according to claim 22, wherein the optical system includes a variable magnification optical system.

* * * * *